(12) United States Patent
Narasimha

(10) Patent No.: US 9,801,223 B2
(45) Date of Patent: Oct. 24, 2017

(54) WIRELESS AD HOC NETWORK ASSEMBLY USING NETWORK CODING

(71) Applicant: MOTOROLA MOBILITY LLC, Chicago, IL (US)

(72) Inventor: Murali Narasimha, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 166 days.

(21) Appl. No.: 14/932,146

(22) Filed: Nov. 4, 2015

(65) Prior Publication Data

US 2017/0127466 A1 May 4, 2017

(51) Int. Cl.

| | | |
|---|---|---|
| H04W 72/04 | (2009.01) | |
| H04W 84/12 | (2009.01) | |
| H04W 76/02 | (2009.01) | |
| H04L 12/24 | (2006.01) | |
| H04W 16/18 | (2009.01) | |
| H04L 12/751 | (2013.01) | |
| H04L 12/753 | (2013.01) | |
| H04W 84/18 | (2009.01) | |

(52) U.S. Cl.
CPC ....... *H04W 76/025* (2013.01); *H04L 41/0806* (2013.01); *H04L 45/02* (2013.01); *H04L 45/48* (2013.01); *H04W 16/18* (2013.01); *H04W 84/18* (2013.01)

(58) Field of Classification Search
CPC ... H04W 76/025; H04W 74/04; H04W 84/12; H04W 80/04; H04W 84/18; H04W 16/18; H04L 41/12; H04L 45/02; H04L 47/32
See application file for complete search history.

(56) References Cited

U.S. PATENT DOCUMENTS

| | | | |
|---|---|---|---|
| 8,780,693 B2 | 7/2014 | Kim et al. | |
| 2009/0135824 A1* | 5/2009 | Liu | H04L 45/02 370/392 |
| 2009/0238109 A1* | 9/2009 | Byard | H04W 40/02 370/328 |
| 2011/0134828 A1 | 6/2011 | Osseiran et al. | |
| 2011/0307765 A1 | 12/2011 | Kim et al. | |

(Continued)

OTHER PUBLICATIONS

Park, et al., CodeCast: A Network-Coding-Based Ad Hoc Multicast Protocol. IEEE Wireless Communications, pp. 76-81 (Oct. 2006).

(Continued)

*Primary Examiner* — Andrew Lee
(74) *Attorney, Agent, or Firm* — Cygan Law Offices P.C.; Joseph T. Cygan

(57) ABSTRACT

A method of setting up a wireless ad hoc network includes constructing an initial network graph by a source device. The network graph represents the source device, at least one intermediate device, and at least one communication path between the source device and the intermediate device. The initial network graph is sent from the source device to the intermediate device along with an update request. The source device receives a second network graph from the intermediate device in response to sending the initial network graph, and determines an updated network graph by performing a union of the initial network graph and the second network graph. The process is performed by each intermediate device required to reach a destination device.

19 Claims, 12 Drawing Sheets

(56) References Cited

U.S. PATENT DOCUMENTS

| | | | |
|---|---|---|---|
| 2012/0128009 A1* | 5/2012 | Yang | H03M 13/2906 370/432 |
| 2012/0182860 A1 | 7/2012 | Liu et al. | |
| 2012/0188934 A1* | 7/2012 | Liu | H04L 12/1863 370/312 |
| 2013/0016629 A1 | 1/2013 | Mallik et al. | |
| 2013/0051377 A1 | 2/2013 | Seferoglu et al. | |
| 2013/0195106 A1 | 8/2013 | Calmon et al. | |
| 2014/0016469 A1* | 1/2014 | Ho | H04L 47/38 370/235 |
| 2014/0064296 A1* | 3/2014 | Haeupler | H04L 49/90 370/412 |
| 2014/0376366 A1* | 12/2014 | Li | H04L 45/16 370/230 |
| 2015/0208318 A1* | 7/2015 | Mosko | H04W 40/04 370/310 |
| 2015/0236947 A1* | 8/2015 | Kobayashi | H04L 45/20 370/254 |
| 2015/0281406 A1* | 10/2015 | Lucani | H04L 1/0057 370/477 |
| 2015/0358118 A1* | 12/2015 | Krigslund | H04W 40/02 370/254 |
| 2016/0094398 A1* | 3/2016 | Choudhury | H04L 45/42 370/254 |
| 2016/0373210 A1* | 12/2016 | Gligoroski | H04L 1/0041 |

OTHER PUBLICATIONS

Wu, et al., Minimum-Energy Multicast in Mobile Ad Hoc Networks Using Network Coding. IEEE Transactions on Communications, vol. 53, No. 11, pp. 1906-1918 (Nov. 2005).

Ahlswede, et al., Network Information Flow. IEEE Transactions on Information Theory, vol. 46, No. 4, pp. 1204-1216 (Jul. 2000).

Jaggi, et al., Polynomial Time Algorithms for Multicast Network Code Construction. IEEE Transactions on Information Theory, vol. 51, No. 6, pp. 1973-1982 (Jun. 2005).

Koetter, et al., An Algebraic Approach to Network Coding. IEEE/ACM Transactions on Networking, vol. 11, No. 5, pp. 782-795 (Oct. 2003).

Li, et al., Linear Network Coding. IEEE Transactions on Information Theory, vol. 49, No. 2, pp. 371-381 (Feb. 2003).

Bannerjee, et al., Energy-Efficient Broadcast and Multicast Trees for Reliable Wireless Communication, IEEE Wireless Communications and Networking, vol. 1, pp. 660-667 (Mar. 2003).

* cited by examiner

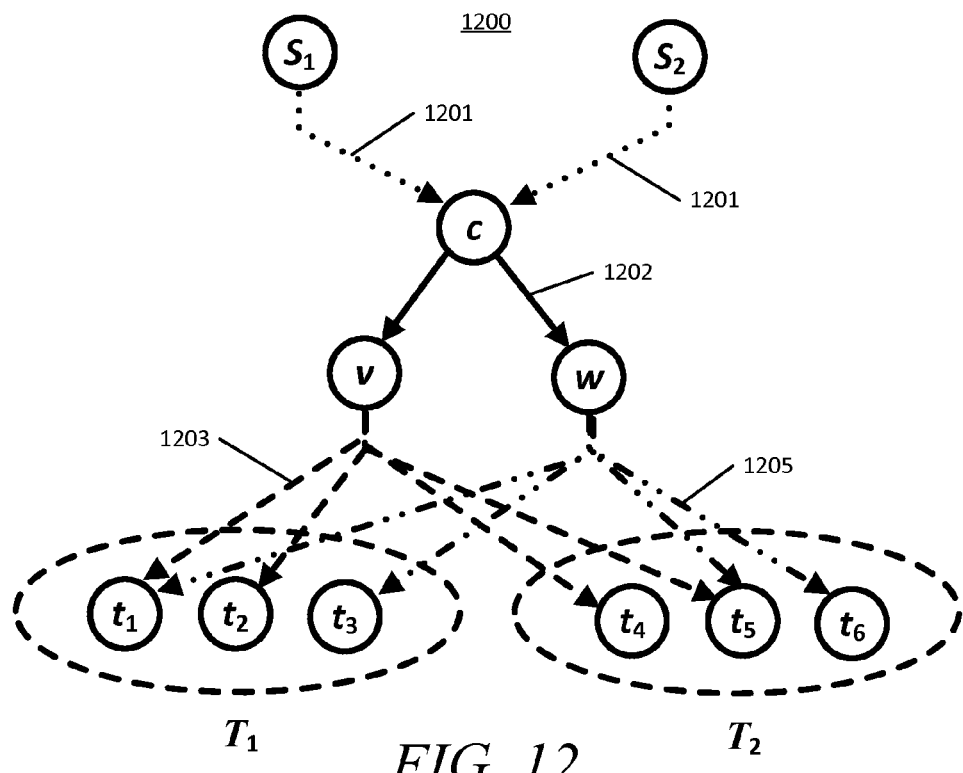
FIG. 12
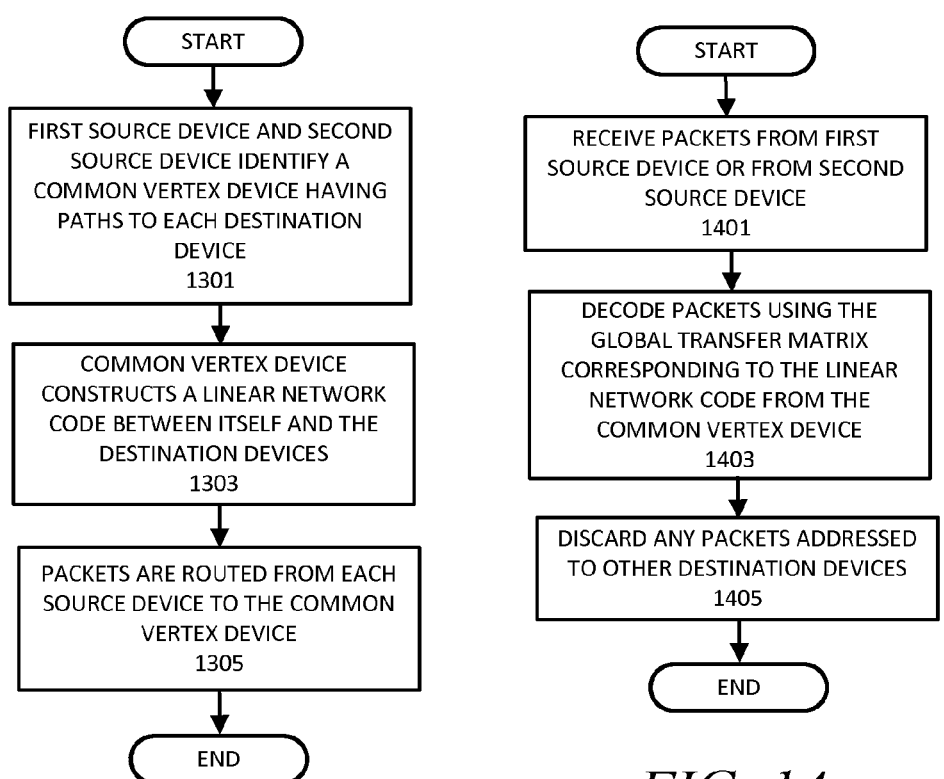
FIG. 13
FIG. 14

WIRELESS AD HOC NETWORK ASSEMBLY USING NETWORK CODING

FIELD OF THE DISCLOSURE

The present disclosure relates generally to device-to-device communication networks such as wireless ad hoc networks or wireless mesh networks and more particularly to the application of network coding to such wireless networks.

BACKGROUND

Various use cases exist for forming device-to-device communication networks such as wireless ad hoc networks or wireless mesh networks. For example a group of public safety personnel (police, firemen, etc.) may form a device-to-device communication group with the devices being geographically distributed such that forming direct communication links is not possible between any arbitrarily chosen set of devices. In other words, the devices could be out of radio coverage range of each other. By using an ad hoc networking or mesh-networking approach, data can be forwarded from a source device (i.e. source node) to one or more destination devices (i.e. destination nodes), through intermediate nodes in the network. In many cases the intermediate nodes that perform such data-forwarding operations may also be destination nodes and this further improves network efficiency. However, forwarding the data through intermediate nodes also implies that some network links can become bottlenecks. Some mesh networking approaches may involve using sophisticated routing algorithms running in the mesh network, but this approach requires maintenance and exchange of routing tables and does not fully alleviate the problem of bottleneck network links.

Network coding is an alternative to routing packets through a mesh network when transmitting data from one node to multiple nodes (i.e. in multicast transmission). Packet routing in a network consists of routers receiving packets on inbound connections, deciding which outbound links to forward those packets on and forwarding the packets. In contrast, for network coding, intermediate nodes take the place of routers and "mix" the inbound packets. This allows the intermediate nodes to transmit fewer mixed packets rather than many original packets. The destination nodes receive the mixed packets and decode the original packets. The mixing consists of computing combinations of incoming packets. For computational ease, linear combinations are used.

FIG. 1 illustrates a known approach to network coding as discussed by Rudolf Ahlswede, Ning Cai, Shuo-Yen, Robert Li and Raymond W. Yeung, "Network Information Flow," IEEE Trans. Inf. Theory, vol. 46. no. 4. (July 2000). [hereinafter "Ahlswede, et al"]. In FIG. 1, a mesh network is represented by a graph 100 with seven nodes in which each edge of the graph 100 represents a communication link. Each edge or communication link is operative to transmit one packet in a given time slot. The goal of the mesh network is to deliver a set of packets from the first node (node 1) to the sixth and seventh nodes (node 6 and node 7) through intermediate nodes.

Given that node 1 has two outbound edges and both edges can lead to both destination node 6 and node 7, it is possible to transmit different packets on the two edges. FIG. 1(*a*) shows the transmission of packets P1 and P2 on the two edges 1→2 and 1→3. Packet P1 can thus be transmitted to node 6 and node 7 respectively via edges 2→6 and 3→7. Node 4 receives both packet P1 and packet P2. However, only one packet can be transmitted in a time slot on edge 4→5. This means that edge 4→5 is a bottleneck communication link in the mesh network.

Viewing the network shown if FIG. 1(*a*) as a pipeline for communication of packets from node 1 to node 6 and node 7, in a first time slot, node 6 may receive packet P1 via edge 2→6 and packet P2 via edge 5→6. However node 7 can then only receive one packet, P2, via edge 3→7 in the first time slot. In a second time slot node 6 will only receive only one packet, P1, via edge 2→6 while node 7 will receive packet P2 via edge 3→7 and packet P1 via edge 5→7. In other words, only 1.5 packets can be received on average at both node 6 and node 7, per time slot, due to the bottleneck created at edge 4→5 which can only transmit one packet per time slot.

FIG. 1(*b*) illustrates the network coding approach. As in FIG. 1(*a*) edges 1→2, 2→6 and 2→4 carry packet P1, and edges 1→3, 3→7 and 3→4 carry packet P2. However in this example, node 4 performs a linear combination of P1 and P2, and transmits the linear combination on edge 4→5. More particularly, the linear combination operations are performed in a Galois Field. In an example in which the packets P1 and P2 are binary digits (i.e. binary "0" or "1"), the linear combination is implemented as an exclusive-OR operation ("XOR"). The linearly combined packet, (i.e. XOR of P1, P2) is then transmitted on edges 5→6 and 5→7. Node 6 therefore receives both packet P1 and packet P1⊕P2. Because node 6 knows the contents of packet P1, it can recover packet P2 from P1⊕P2 by performing an XOR operation of packet P1 and packet P1⊕P2. Similarly node 7 receives packet P2 and packet P1⊕P2 and recovers packet P1 from packet P1⊕P2. In other words, the scheme illustrated in FIG. 1(*b*) enables node 6 and node 7 to each receive two packets per time slot.

The computation of a "linear network code" (also known as a Linear Code Multicast, or LCM) for multicasting packets from source devices to destination devices in an arbitrary network has been discussed extensively in the literature. The devices are considered to be network "nodes" where a source device or source node is designated as "s" and a destination device or destination node (also referred to as a "sink node") is designated as "T".

Thus, as a mathematically informal example to illustrate the concepts of network coding (i.e. without detailed discussion of vector spaces), given an arbitrary network with source nodes "s" and a set of sink nodes "T", where the arbitrary network is defined by a directed graph G=(V, E, s, T) where V is the set of vertices, E⊆ V×V, is the set of edges, s is the source vertex and T is the set of sink nodes, then a linear network code or LCM for the network represented by the directed graph consists of:

i. a Galois field F;
ii. for each e ∈ E', E' ⊆ E an assignment of an "Encoding Vector" EV(e), over elements of F to each edge e ∈ E', E' ⊆ E; and
iii. for each t ∈ T, a "Global Transfer Matrix" $G_T(t)$.

The following additional conditions need to be satisfied:
a) $L_v(e)$, where e=x→y, has to be a linear combination of the elements of $\{L_v(e')|e' \in E', e'=u→x, u \in V\}$, i.e., a linear combination of the local encoding vectors for the inbound edges.
b) for each t ∈ T:
   i. $G_T(t)$ is an r×r matrix, where r is the minimum of number of edge-disjoint paths (i.e. distinct paths) from s to each t ∈ T;

ii. each row of $G_T(t)$ represents an encoding vector for one of the edge-disjoint paths from s to t; and iii. $G_T(t)$ is a full rank matrix.

Given the definitions and requirements set forth above, multicast packet transmission from a source device "s" to each destination device "t", where "t" represents one destination device as an element of the set of destination devices "T" (i.e. $t \in T$), consists of the following procedures. First, each intervening device between the source devices and the destination devices constructs at "local transfer matrix". These intervening devices are referred to herein interchangeably as "vertices", "vertex devices" or "nodes". Source devices and destination devices are also referred to herein as "nodes" and are referred to as "source nodes" and "destination nodes," respectively, when necessary for purposes of clarity. For example, turning to FIG. 2, a source device in a network graph 200 is represented by node 1, vertex devices are represented by nodes 2 through 6 and node 8, and destination devices are represented by node 7 and node 9.

Each vertex device (designated as a "node v") constructs a local transfer matrix "$L_v$" using encoding vectors (EV) defined for the inbound graph edges directed to the vertex device, and encoding vectors defined for the outbound graph edges directed away from the vertex device. More particularly, the local transfer matrix $L_v$ at a vertex device is determined based on the following relationship between the outbound graph edge encoding vectors and the inbound graph edge encoding vectors:

$$\begin{bmatrix} EV(o_1) \\ EV(o_2) \\ \vdots \\ EV(o_m) \end{bmatrix} = L_v \begin{bmatrix} EV(i_1) \\ EV(i_2) \\ \vdots \\ EV(i_n) \end{bmatrix},$$

where $o_1, o_2, \ldots, o_m \in E'$ are outbound graph edges directed away from v and $i_1, i_2, \ldots i_m \in E'$ are inbound graph edges directed to the vertex device v.

The local transfer matrix "$L_s$" for the source device is computed as the identity of the encoding vectors defined for the outbound graph edges directed away from the source device. In other words, $L_s$ is computed based on the following relationship:

$$\begin{bmatrix} EV(o_1) \\ EV(o_2) \\ \vdots \\ EV(o_m) \end{bmatrix} = L_s I_r, \text{ where } I_r \text{ is the } r \times r \text{ identity matrix.}$$

For packet transmission, the source device s constructs "r" packet data fragments designated as $[p_1, p_2, \ldots, p_r]$ such that each data fragment $p_1$ is an element of an alphabet subset. At the source device (i.e. source node s), outgoing packet data fragments $P_{out}(s) = [p_{out}^1(s), p_{out}^2(s), \ldots, p_{out}^n(s)]$ on outbound edges are computed using the source local transfer matrix $L_s$ such that: $P_{out}(s)^T = L_s [p_1, p_2, \ldots, p_r]^T$.

At each subsequent network node (designated as "u"), once packet data fragments on all inbound edges are received, the packet data fragments for the outbound edges are computed. If $P_{in}(u) = [p_{in}^1(u), p_{in}^2(u), \ldots, p_{in}^n(u)]$ are the packet data fragments received on the inbound edges to network node u, and $P_{out}(u) = [p_{out}^1(u), p_{out}^2(u), \ldots, p_{out}^n(u)]$ are the packet data fragments to transmit on the outbound edges from network node u, then $P_{out}(u)^T = L_u P_{in}(u)^T$.

At each destination device, once the packet: data fragments $P_{in}(t)$ on all the inbound edges are received, the original packet data fragments are recovered by performing a matrix operation using the inverse of a global transfer matrix such that: $G_T(t)^{-1} P_{in}(t)$.

As a brief overview of constructing a linear network code which, as discussed above, is also referred to as a linear code multicast or LCM, a reduced network is first determined based on the network directed graph such as the example network directed graph 200 shown in FIG. 2. The reduced network is determined by identifying "cuts" separating the source devices from the destination devices. More specifically, a "cut" separating a source device "s" and a destination device "t" is a set of edges of E such that any path from s to t contains an edge from the set. A "minimal cut" separating a source device from a destination device is a cut of the smallest size separating the source device from the destination device. Given these definitions, an example procedure for constructing an LCM given a graph $Y=(V, E, s, T)$ is as follows:

1. Let $r = \min\{mincut(s, t) | t \in T\}$, where $mincut(s, t)$ denotes a minimal cut separating s and t.
2. Determine a reduced network $Y_R = (V, E_R, s, T)$ consisting of r edge disjoint paths from s to each $t \in T$.
3. Select global encoding vectors for each $e \in E_R$ and construct global transfer matrices $G_t$ for each $t \in T$, such that:
    a. If e influences t on the i-th path, the i-th row of $G_t$ is set to the encoding vector selected for e;
    b. $G_t$ is invertible.

Given the above example procedures and turning again to the network directed graph 200 of FIG. 2, the goal is to multicast packet data from the source node 1 to the destination nodes 7 and 9. FIG. 3 illustrates an example reduced network graph 300 for the network shown in FIG. 2. In the reduced network graph 300 of FIG. 3, there are three edge-disjoint paths from node 1 to node 7 and twin node 1 to node 9. Thus it is possible to send three packets from node 1 to node 7 in one use of the reduced network, for example during one packet transmission timeslot. Similarly it is possible to send three packets from node 1 to node 9 in one use of the reduced network or during one packet transmission timeslot. However, if three packets are to be multicast from node 1 to node 7 and node 9 during the same interval, then the edge 5→8 becomes a bottleneck.

To resolve the bottleneck, a linear network code can be created based on the procedures described above using a Galois Field of size 256. The following global encoding vectors are therefore generated for the edges:

$L_v(1 \to 4) = [88\ 211\ 218]$ $L_v(4 \to 7) = [12\ 197\ 255]$;
$L_v(1 \to 5) = [56\ 49\ 150]$ $L_v(5 \to 7) = [34\ 34\ 210]$;
$L_v(1 \to 2) = [164\ 36\ 246]$ $L_v(2 \to 5) = [97\ 42\ 223]$;
$L_v(5 \to 8) = [106\ 214\ 103]$ $L_v(8 \to 7) = [91\ 158\ 191]$;
$L_v(5 \to 9) = [199\ 181\ 196]$ $L_v(2 \to 6) = [\mathbf{182\ 229\ 237}]$;
$L_v(6 \to 9) = [65\ 205\ 239]$ $L_v(4 \to 5) = [144\ 153\ 59]$;
$L_v(8 \to 9) = [232\ 93\ 231]$;

The global transfer matrix 303 for the destination device at node 7 is defined then as:

$$G_7 = \begin{bmatrix} 12 & 197 & 255 \\ 34 & 34 & 210 \\ 91 & 158 & 191 \end{bmatrix};$$

while the global transfer matrix 309 for the destination device at node 9 is defined as $$G_9 = \begin{bmatrix} 199 & 181 & 196 \\ 65 & 205 & 239 \\ 232 & 93 & 231 \end{bmatrix}.$$

FIG. 3 also illustrates the traversal of one set of packets 301 through the reduced network. As shown, the transmitted packets 301 can be retrieved from the packets received at each destination devices using the global transfer matrix for that destination device. Therefore as shown in FIG. 3 for node 7, the inverse of the global transfer matrix 305 is multiplied by the received packets 307 to obtain the original transmitted packets 301. For node 9, the inverse of the global transfer matrix 311 is multiplied by the received packets 313 to obtain the original transmitted packets 301.

BRIEF DESCRIPTION OF THE DRAWINGS

FIG. 12 is a network diagram of a network having two source devices and a common vertex device in accordance with an embodiment.

FIG. 13 is a flowchart of an example process in a source device in the network illustrated in FIG. 12 in accordance with an embodiment.

FIG. 14 is a flowchart of an example process in a destination device in the network illustrated in FIG. 12 in accordance with an embodiment.

DETAILED DESCRIPTION

Figure 1:
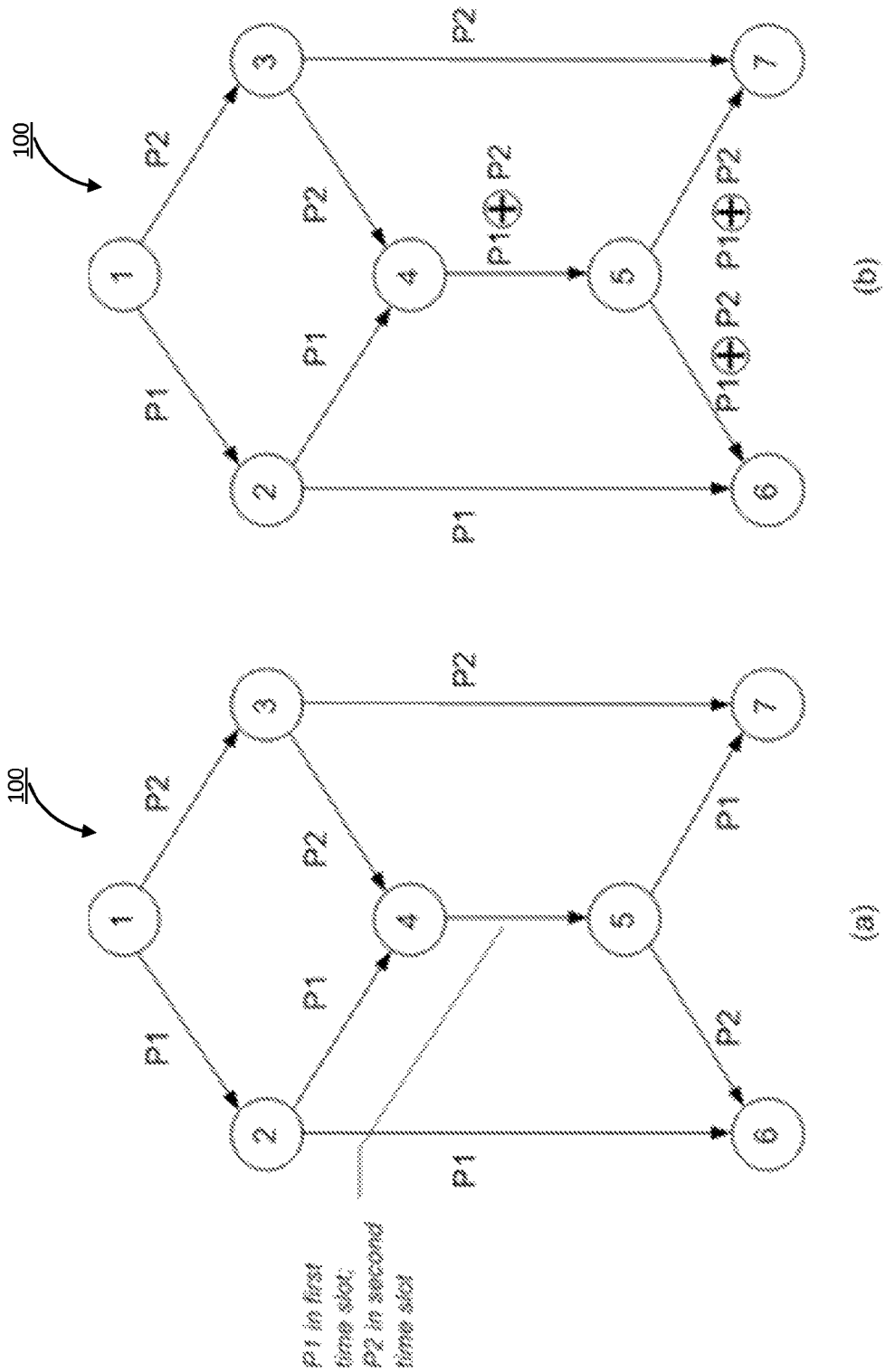
FIG. 1 is an example network directed graph showing how an edge of the directed graph may become a bottleneck fix packet transmission from a source node to destination nodes, and a solution using packet mixing.
Figure 2:
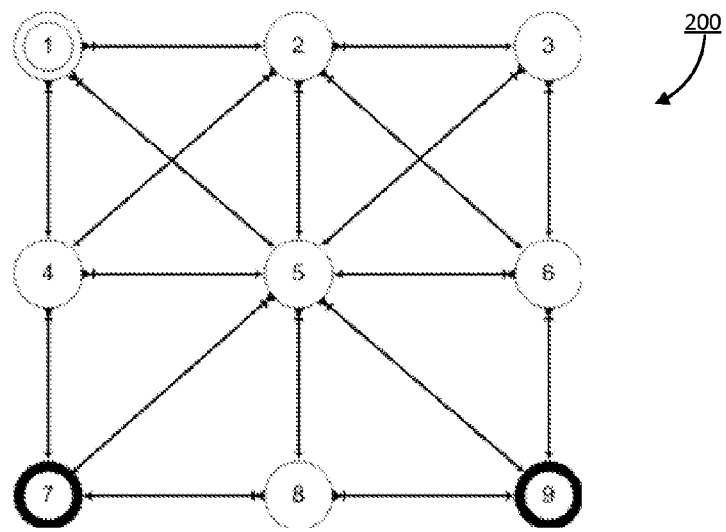
FIG. 2 is an example network directed graph having one source node and two destination nodes.

Briefly, the present disclosure provides processes for assembling a wireless ad hoc network with network coding. The wireless ad hoc networks assembled using the disclosed processes, among other things, have improved throughput because the number of transmissions at the intermediate nodes are minimized. The disclosed processes provide for one-to-many communication such as when packets are multicast from one source device to several destination devices, and many-to-many communication, such as when different streams of packets may be transmitted from a source device to a corresponding set of destination devices within the ad hoc network.

In an aspect of the present disclosure, a method of setting up a wireless ad hoc network includes constructing an initial network graph by a source device. The network graph represents the source device, at least one intermediate device, and at least one communication path between the source device and the intermediate device. The source device sends the initial network graph to the intermediate device and requests an update; receives a second network graph from the intermediate device in response to sending the initial network graph and determines an updated network graph by performing a union of the initial network graph and the second network graph. The method may further include determining a reduced network graph using the updated network graph; determining a linear network code using the reduced network graph; and sending the linear network code to the intermediate device and to at least one destination device. In some embodiments, the method may further include determining that the intermediate device meets a packet data transmission criteria; and constructing the initial network graph representing at least one communication path between the source device and the intermediate device in response to the intermediate, device meeting the packet data transmission criteria. In some embodiments, the method may further include determining that the intermediate device meets a packet data transmission criteria; and sending the initial network graph to the intermediate device and requesting an update in response to determining that the intermediate device meets the packet data transmission criteria.

In another aspect of the present disclosure, a method of setting up a wireless ad hoc network includes constructing an initial network graph by a source device, where the network graph represents the source device, at least one intermediate device, and at least one communication path between the source device, and the intermediate device. The source device sends the initial network graph to the intermediate device and requests an update of the initial network graph; receives a second network graph from the intermediate device as the update in response to sending the initial network graph and in response to the signal strength of the source device meeting a threshold as measured by the intermediate device; and determines an updated network graph by performing a union of the initial network graph and the second network graph. The method may further include determining a reduced network graph using the updated network graph; determining a linear network code using the reduced network graph; and sending the linear network code to the intermediate device and to at least one destination device.

In another aspect of the present disclosure, a method of setting up a wireless ad hoc network includes receiving wireless interface measurements of a source device from a plurality of neighbor devices by the source device and determining which neighbor device measurements meet a first threshold; constructing an initial network graph by the source device, where the network graph represents the source device, and any neighbor device for which the neighbor device measurements met the first threshold, and at least one communication path between the source device and each neighbor device represented on the initial network graph. The source device sends the initial network graph to each neighbor device represented on the initial network graph and requests a network graph update from each neighbor device represented; receives a network graph update from each neighbor device to which the initial network graph was sent, in response to sending the initial network graph; and revises the initial network graph by performing a union of the initial network graph and the network graph updates.

The method may further include each neighbor device acting as an intermediate source device during construction of the network graph updates, and receiving wireless interface measurements of itself as the intermediate source device from a plurality of downstream neighbor devices and determining which downstream neighbor device measurements meet the first threshold; constructing the network graph update by the intermediate source device, where the network graph update represents the intermediate source device, and any downstream neighbor device for which the downstream neighbor device measurements met the first threshold, and at least one communication path between the intermediate source device and each downstream neighbor device represented on the network graph update. The neighbor device further sends the network graph update to each downstream neighbor device represented on the network graph update and requests a downstream network graph update from each downstream neighbor device represented; receives a downstream network graph update from each downstream neighbor device, to which the network at update was sent, in response to sending the network graph update; and revises the network graph update by performing a union of the network graph update and the downstream network graph updates.

In another aspect of the present disclosure, a method of operating a wireless ad hoc network includes configuring an intermediate device on communication paths from a first source device and a second source device to a plurality of destination devices with a first linear network code corresponding to the first source device and a second linear network code corresponding to the second source device; receiving packet data by the intermediate device from either the first source device or from the second source device; determining by the intermediate device whether to apply the first linear network code or the second linear network code to the packet data; and generating outgoing packet data from the intermediate device to at least one destination device of the plurality of destination devices using either the first linear network code or the second linear network code.

In some embodiments, determining by the intermediate device whether to apply the first linear network code or the second linear network code to the packet data, may be accomplished by receiving the packet data by the intermediate device from either the first source device encoded using the first linear network code or from the second source device encoded using the second linear network code; and checking an un-encoded packet data header of the packet data for identification of the linear network code used to encode the packet data pay load.

In another aspect of the present disclosure, a wireless ad hoc network includes a first source device wirelessly coupled to a first destination device through a plurality of intermediate devices and operative to use a first linear network code corresponding to the first source device to send packet data from the first source device to the first destination device. A second source device is wirelessly coupled to a second destination device through the plurality of intermediate devices and is operative to use a second linear network code corresponding to the second source device to send packet data from the second source device to the second destination device. The plurality of intermediate devices are each configured with both the first linear network code and the second linear network code. In some embodiments, each intermediate device is operative to receive packet data front either the first source device encoded using the first linear network code or from the second source device using the second linear network code, and to determine whether to apply the first linear network code or the second linear network code to the packet data. The intermediate device generates outgoing packet data to the first destination device using the first linear network code and to the second destination device using the second linear network code.

In another aspect of the present disclosure, a method of operating a wireless ad hoc network includes configuring an intermediate device on communication paths from a first source device and a second source device to a plurality of destination devices with a linear network code corresponding to the intermediate device; receiving muted packet data by the intermediate device from either the first source device or from the second source device; and generating outgoing packet data to at least one destination device of the plurality of destination devices using the linear network code corresponding, to the intermediate device. The method may further include receiving packet data from both the first source device for a first destination device and from the second source device for a second destination device; generating outgoing packet data to the first destination and to the second destination device using the linear network code; sending the outgoing packet data to the first destination and to the second destination device; and receiving and decoding the outgoing packet data by the first destination device and the second destination device where the first destination device discards any decoded packets that are addressed to the second destination device and the second destination device discards any decoded packets that are addressed to the first destination device.

In another aspect of the present disclosure, a wireless ad hoc network includes a first source device wirelessly coupled to a first destination device through a common intermediate device and a plurality of intermediate devices downstream from the common intermediate device. The first source device is operative to send packet data to the common intermediate device addressed to the first destination device a second source device is wirelessly coupled to a second destination device through the common intermediate device and the plurality of intermediate devices downstream from the common intermediate device, and is operative to send packet data to the common intermediate device addressed to the second destination device. The common intermediate device and the plurality of intermediate devices downstream from the common intermediate device are each configured with a linear network code corresponding to the common intermediate device. The common intermediate device is operative to receive routed packet data transmitted by the intermediate device from either the first source device or from the second source device; and generate outgoing packet data to one or both of the first destination device and the second destination device using the linear network code.

In another aspect of the present disclosure, a method of operating a wireless ad hoc network includes determining a group of intermediate devices or communication paths from a first source device and a second source device to a set of destination devices where each intermediate device of the group has a communication path to a corresponding subset of destination devices such that a communication path exists from both the first source device and the second source device to each destination device of the set of destination devices; configuring each intermediate device of the group of intermediate devices with a first linear network code corresponding to the first source device, and with a second linear network code corresponding to the second source device and configuring each intermediate device of the group of intermediate devices with an addition linear network code between itself and its corresponding subset of destination devices.

The method may further include receiving packet data by a first intermediate device of the group of intermediate devices from either the first source device or from the second source device; decoding the packet data using the first linear network code if the packet data was sent from the first source device, or using the second linear network code if the packet data was sent from the second source device: and generating outgoing packet data to a subset of destination devices corresponding to the first intermediate device using a linear network code corresponding to the first intermediate device.

In another aspect of the present disclosure, a wireless ad hoc network includes a first source device wirelessly coupled to a group of destination devices through a group of common intermediate devices and operative to send packet data to the common intermediate devices addressed to one or more subsets of the group of destination devices. A second source device is wirelessly coupled to the group of destination devices through the group of common intermediate devices and is operative to send packet data to the common intermediate devices addressed to the one or more subsets of the group of destination devices. Each common intermediate device of the group of common intermediate devices is configured with a first linear network code corresponding to the first source device, a second linear network code corresponding to the second source device, and a third linear network code corresponding to the common intermediate device and a corresponding subset of the group of destination devices, where the group of destination devices comprises all of the subsets of destination devices corresponding to each common intermediate device. The wireless ad hoc network may further include a plurality of additional intermediate devices downstream from the common intermediate devices, where each additional intermediate device is configured with the third linear network code corresponding to its upstream common intermediate device.

In another aspect of the present disclosure, a method of operating a wireless ad hoc network includes constructing a first network graph by a first source device, where the first network graph represents the first source device, at least one first intermediate device, and at least one first communication path between the first source device, the first intermediate device and a group of destination devices. A second source device constructs a second network graph representing the second source device, at least one second intermediate device, and at least one second communication path between the second source device, the second intermediate device and the group of destination devices. The first source device determines a reduced first network graph and the second source device determines a reduced second network graph. A composite network graph is then determined as the union of the reduced first network graph and the reduced second network graph. The composite network graph is modified by adding a virtual source device and a plurality of virtual intermediate devices downstream from the virtual source device and upstream from the first source device and the second source device. Communication paths are selected in the composite network graph such that there are no linearly combined packets required from the virtual source device to any destination device of the group of destination devices. A linear network code is then determined corresponding to the virtual source device using the composite network graph and the first source device, the second source device, the at least one first intermediate device, the at least one second intermediate device and the group of destination devices are each configured with the linear network code.

In another aspect of the present disclosure, a wireless ad hoc network includes a first source device wirelessly coupled to a group of destination devices through a first group of intermediate devices and operative, to send packet data to the group of intermediate devices addressed to one or more destination devices of the group of destination devices. A second source device is wirelessly coupled to the group of destination devices through a second group of intermediate devices and is operative to send packet data to the second group of intermediate devices addressed to the one or more destination devices of the group of destination devices. The first source device, the second source device, each intermediate device of the first group of intermediate devices and of the second group of intermediate devices, and each destination device of the group of destination devices, is configured with a linear network code corresponding to a virtual source device upstream from the first source device and the second source device, such that packets sent from the first source device and the second source device to any destintion device of the group of destination devices, are not linearly combined.

Figure 4:
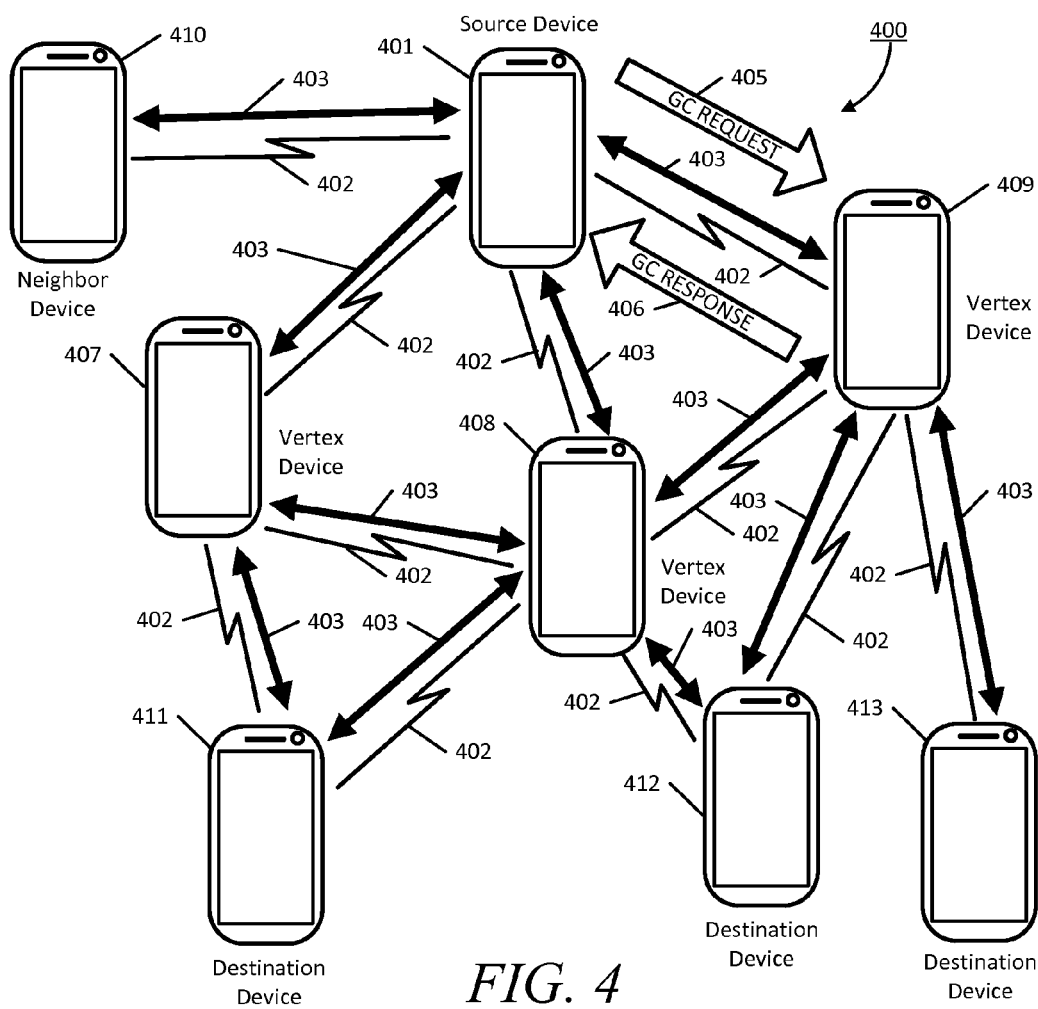
FIG. 4 is a diagram of a wireless ad hoc network in accordance with the embodiments.
Figure 3:
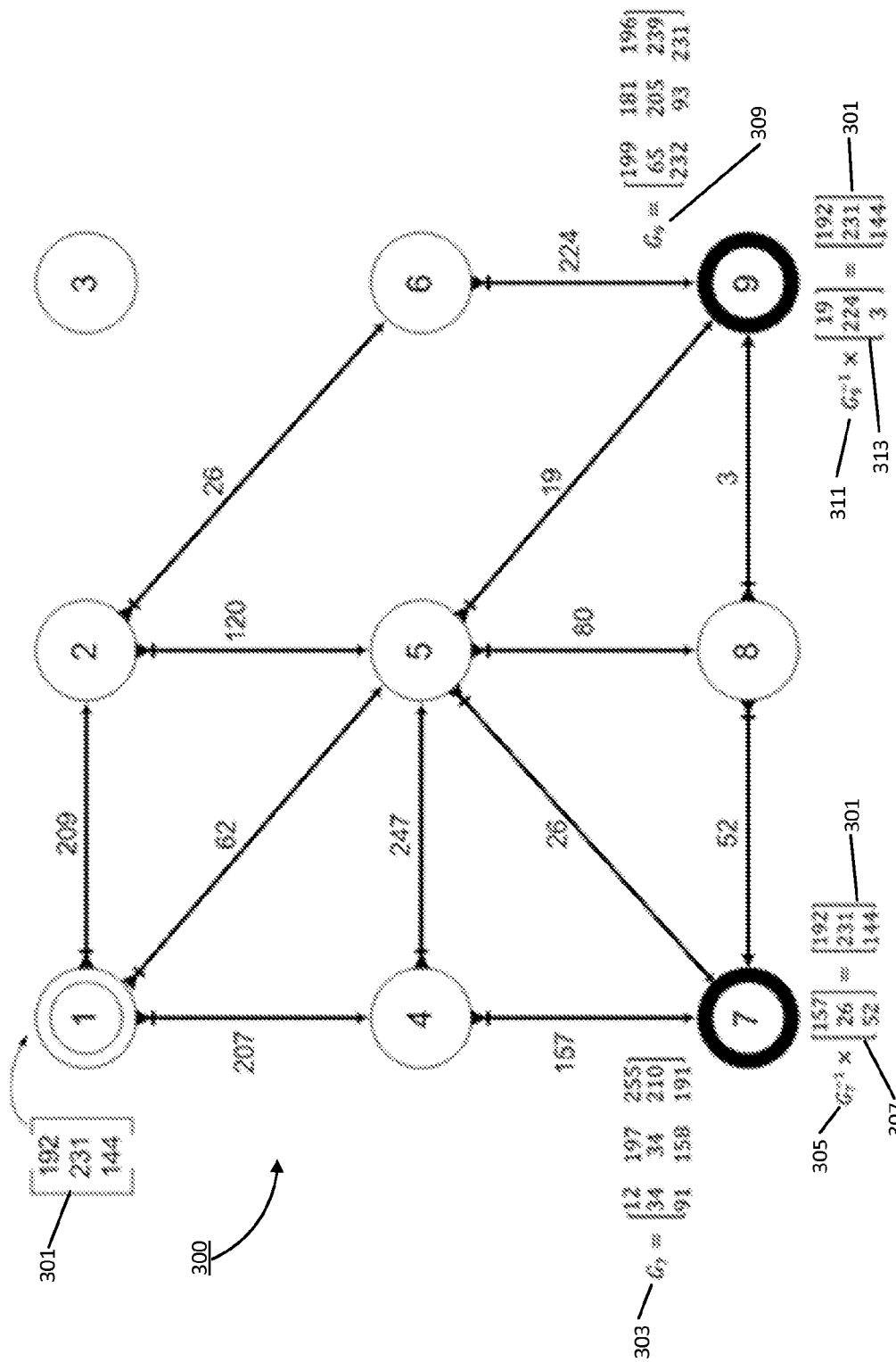
FIG. 3 is an example reduced network directed graph for the network directed graph of FIG. 2 and illustrating an example network coding scheme.

Turning now to the drawings, FIG. 4 illustrates in example Wireless ad hoc network 400 in accordance with the embodiments. The example wireless ad hoc network 400 includes a source device 401 and three destination devices; destination device 411, destination device 412 and destination device 413. The example ad hoc network 400 also includes intermediate devices between the source device 401 and the destination devices. Put another way, intermediate devices are "downstream" from the source device 401 and "upstream" from the destination devices. These intermediate devices include vertex device 407, vertex device 408 and vertex device 409. The network also includes neighbor device 410, which is a neighbor of the source device 401, but is not a vertex device. The terms "upstream" and "downstream" as used in the present disclosure are to be understood as relative terms for the purposes of explanation with respect to the flow of packet data through the ad hoc network. More particularly, packet data flows downstream from the source, through intermediate devices such as vertex devices, and on to destination devices. Some information such as acknowledgements may flow upstream to the source device.

In accordance with the embodiments, the source device 401 scans for wireless signals on a wireless interface 402 and identifies surrounding neighbor devices such as neighbor device 410. Vertex devices 407, 408 and 409 are also neighbor devices to the source device 401 and would also be discovered by the wireless signal scan. The source device 401 measures a radio-signal-strength-indicator (RSSI) or equivalent, such as the signal-to-noise-and-interference ratio (SINR), for wireless signals received on the wireless interface 402 from each of the neighbor devices. If the measured neighbor device RSSI or SINR, etc. is within a predetermined threshold for packet data transmission, the source device 401 exchanges messages 403 with the neighbor devices and requests additional measurement information.

The neighbor devices in turn, measure a second threshold for packet data transmission and for reporting acknowledgements to the source device 401. The neighbor devices each report their respective measurements to the source device 401 via messages 403. If both radio measurement thresholds are met at the source device 401 and at the neighbor device, the source device 401 will designate the neighbor device as a "vertex device" in the network. For example, vertex devices 407, 408 and 409 are designated as vertex devices by the source device 401. Neighbor device 410 did not meet one of the radio measurement thresholds and therefore was not designated as a vertex device by the source device 401. Therefore, neighbor device 410 does not become part of the wireless ad hoc network 400. The source device 401 constructs a network directed graph and adds the vertex devices as vertexes or nodes in the graph. The source device 401 then sends a copy of the network directed graph in a "graph construction request" (GC request) 405 to each of the designated vertex devices which, in this example, are vertex devices 407, 408 and 409.

Each of the designated vertex devices receives the GC request, and runs through the same operations as the source device 401 did. That is, each vertex device scans for wireless signals on a wireless interface 402 and identifies surrounding neighbor devices. In other words, the vertex devices act as a source device with respect to their neighbor devices as they determine further parts of the network directed graph. In the case of a vertex device, some of its neighbor devices ma have already been designated as vertex devices by the source device 401. For example, vertex device 408 is a neighbor device to vertex device 407 and to vertex device 409. Regardless of whether the vertex device's neighbor devices have been previously designated as vertex devices, messages 403 will be exchanged and the radio measurement thresholds will be checked to determine if any of the neighbor devices should have an edge added to the network directed graph.

The requirement of meeting radio signal measurement thresholds as measured between two devices is referred to herein as the "edge presence rule." In other words, any two devices in the wireless ad hoc network 400 that communicate using the wireless interface 402, check the wireless interface 402 to be sure that packet data transmission with acknowledgement can be sustained. If the communication can be sustained based on meeting the predetermined radio signal measurement thresholds, then one of the devices adds an "edge" in the network directed graph and then passes the network directed graph on to the next device.

Thus the vertex device 407 will determine that its neighbor devices are vertex device 408 destination device 411 and source device 401. The vertex device 407 will add two new edges to its copy of the network directed graph; a first edge between itself and vertex device 408 and a second edge between itself and destination device 411. An edge will not be added between the vertex device 407 and the source device 401, because the source device 401 will have already added this edge. The vertex device 407 will then send an updated copy of the network directed graph to vertex device 408 and to destination device 411 along with a GC request 405. The vertex device 407 will then wait to receive a GC response 406 from each device to which it sent the GC request 405.

This process will continue for all devices in the wireless ad hoc network 400 until the destination devices 411, 412 and 413 are reached. More particularly, each neighbor device becomes a candidate for inclusion in the wireless ad hoc network 400. If the neighbor device meets both radio measurement thresholds then it is designated as a vertex device if not already so designated, and an edge is added between it and at least one other device. After a device receives a GC response 406 from each device to which it previously sent a GC request 405, it updates the network directed graph as a union of the updated network directed graphs that it received from each device. The term "union" as used herein with respect to network directed graphs refers to operations determining: i) a set of vertices that is a union of sets of vertices in two, or more, network directed graphs; and ii) a set of edges that is a union of the sets of edges in the two or more network directed graphs. The union of graphs therefore results in a "composite" graph that includes the set of vertices and the set of edges determined by the union operation. The updated network directed graphs (determined by the union operations) are thus propagated upstream through the wireless ad hoc network 400 until the source device 401 receives a GC response 406 from each device to which it sent a GC request 405. In the example wireless ad hoc network 400, the source device 401 would have received a GC response 406 from vertex device 407, vertex device 408 and vertex device 409. The source device 401 would then update the network directed graph as a union of the network directed graph updates that it received from vertex device 407, vertex device 408 and vertex device 409. At that point, construction of the wireless ad hoc network 400 is completed and the process of constructing a linear network code would begin.

Various terms that are used in the present disclosure include "device" "source device," "neighbor device," "vertex device," "destination device," "operative device," "node," "path" and "edge." A "device" as used herein refers to a mobile device such as, but not limited to, a mobile telephone such as a smartphone, a wearable device such as a smartwatch, a laptop computer, tablet computer, electronic book reader, etc. that has wireless communication capability. A "source device" as used herein is a device that transmits packet data to a "destination device" such that a "destination device" as used herein is a device to which packet data is sent by the source device. A "neighbor device" as used herein is a device that is physically near enough to another device such that a direct wireless connection can be established and maintained between the two devices. A "vertex device" as used herein refers to a device that can be used to relay packet data between to source device and a destination device. A neighbor device may, or may not be, a vertex device depending upon whether a wireless connection can be formed and maintained that meets predetermined requirements for the wireless connection with respect to packet data transmission and acknowledgement. Whenever the predetermined requirements for a wireless connection are met between two devices, a line can be drawn between the two devices in a network directed graph. Such a line is referred to herein as an "edge" and represents a wireless connection that meets predetermined requirements for packet data transmission and acknowledgement. In a network directed graph a "node," as used herein, represents a "device" and may more particularly represent a source device, vertex device or destination device. Thus a "network directed graph" as used herein is a representation of a wireless ad hoc network with "nodes" representing "source devices," "vertex devices" and "destination devices," and "edges" representing wireless connections between such devices. A "path" between any two devices may consist of multiple intermediate devices (i.e. multiple intermediate nodes or vertices) interposed sequentially between the two devices with edges between the various nodes along the path. The term "operative device" as used herein is a relative term that refers to a device when that device is performing one or more operations of a process described herein. More particularly, flowcharts provided in the figures refer to an "operative device" performing the process operations and the operative device may be a source device, vertex device (i.e, an intermediate device) or a destination device depending upon the circumstances. For example as a directed graph is propagated to neighbor devices for purposes of setting up an ad hoc network, each neighbor device of the ad hoc network will eventually assume the role of operative device until the ad hoc network setup is completed.

Figure 5:
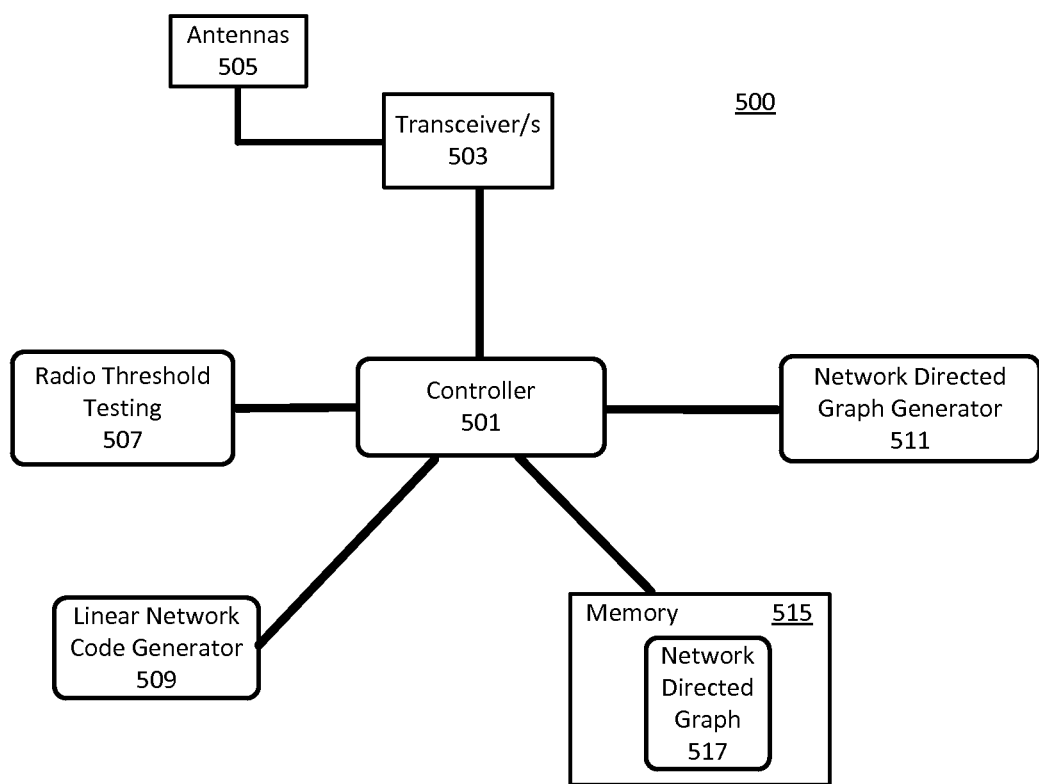
FIG. 5 is a block diagram of an example network device, which may be a source device, vertex device, or destination device, in accordance with the embodiments.

An example mobile device 500 is illustrated in FIG. 5. The example mobile device 500 includes a controller 501 that is operatively coupled to various other components including one or more transceivers 503, radio threshold testing logic 507, linear network code generator 509, non-volatile non-transitory memory 515 and network directed graph generator 511. Each of the various components of the mobile device 500 that are operatively coupled to the controller 501 may accordingly send information to, or receive information from, the controller 501. The one or more transceivers 503 are also operatively coupled to one or more antennas 505. The antennas 505 are operatively coupled to the transceivers 503 by appropriate radio frequency (RF) coupling.

The radio threshold testing logic 507 is operative to communicate with the one or more transceivers 503 to send and receive messages from neighbor devices and to obtain wireless interface measurement data from the neighbor devices. The wireless interface measurement data may be, for example, a received signal strength indicator (RSSI), signal-to-noise ratio (SNR), signal-to-noise-plus-interference ratio (SINR), etc. The transceivers 503 may implement one or more wireless interfaces for establishing device-to-device communication. The wireless interfaces used by mobile device 500 for device-to-device communication in a wireless ad hoc network may be, but are not limited to, a Long Term Evolution, 4$^{th}$ Generation (4G LTE) wireless interface such as 4G LTE unlicensed bands, IEEE 802.11x (WiFi®), Bluetooth®, etc.

The radio threshold testing logic 507 may obtain RSSI, SINR or other wireless interface measurement data, or some other radio frequency (RF) system related measurement, from the transceivers 503, and may also receive wireless interface measurement data from neighbor devices and may assess that data to determine whether neighbor device should be a vertex device in an ad hoc network. For this determination, the radio threshold testing logic 507 assesses two measurements against two corresponding thresholds. The first threshold is for the wireless interface signal strength to be at a level sufficient for packet data communication. The second threshold is to ensure that an acknowledgement can be received from the neighbor device. Thus if the neighbor device can successfully receive ordered packets, and the source device can successfully receive acknowledgements when those packets are received, then the neighbor device can be designated as a vertex device by the source device. The vertex device can then assume the role of source device for the purpose of determining which of its neighbor devices may be designated as vertex devices. The network directed graph generator 511 is operative to send an initial version of the network directed graph 517 to neighbor devices.

The network directed graph generator 511 generates the network directed graph 517 by initially adding mobile device 500 neighbor devices that pass the edge presence rule, as vertex devices in the network directed graph 517. The radio threshold testing logic 507 obtains the wireless interface measurements from the neighbor devices via the transceiver/s 503 and designates neighbor devices as vertex devices accordingly. This information is then passed by the controller 501 to the network directed graph generator 511. The network directed graph generator 511 generates and stores the network directed graph 517 in memory 515, and sends a copy to each designated vertex device along with a graph construction request by using the transceivers 503. The network directed graph generator 511 is operative to receive network directed graph versions from each device to which it sent a graph construction request, and to update the network directed graph 517 as a union of all received network directed graph versions.

When the mobile device 500 assumes the role of a source device, after a final version of the network directed graph 517 is completed, the network directed graph generator 511 obtains a linear network code from the linear network code generator 509. The linear network code generator 509 is operative to generate a linear network code and include it with the network directed graph 517. The network directed graph generator 511 is operative to propagate the network directed graph 517, including the linear network code, through the wireless ad hoc network to each vertex device and to the destination devices.

It is to be understood that any of the above, described components in the example mobile device 500 may be implemented as software or firmware (or a combination of software and firmware) executing on one or more processors, or using ASICs (application-specific-integrated-circuits), DSPs (digital signal processors), hardwired circuitry (logic circuitry) state machines, FPGAs (field programmable gate arrays) or combinations thereof. Therefore the mobile devices illustrated in the drawing figures described herein provide examples of a mobile device and art not to be construed as a limitation on the various other possible mobile device implementations that may be used in accordance with the various embodiments.

More particularly, the radio threshold testing logic 507 and/or the network directed graph generator 511 and/or the linear network code generator 570, may individually or in combinations, be a single component or may be implemented as any combination of DSPs, ASICs, FPGAs, CPUs running executable instructions, hardwired circuitry, state machines, etc., without limitation. Therefore, as one example, the radio threshold testing logic 507 may be implemented using an ASIC or an FPGA. In another example, the network directed graph generator 511 and linear network code generator 509 may each be a combination of software or firmware executed by a processor that gathers CC responses, constructs an overall network directed graph as a union of received network directed graphs, and generates a linear network code, etc. These example embodiments and other embodiments are contemplated by the present disclosure.

Figure 6:
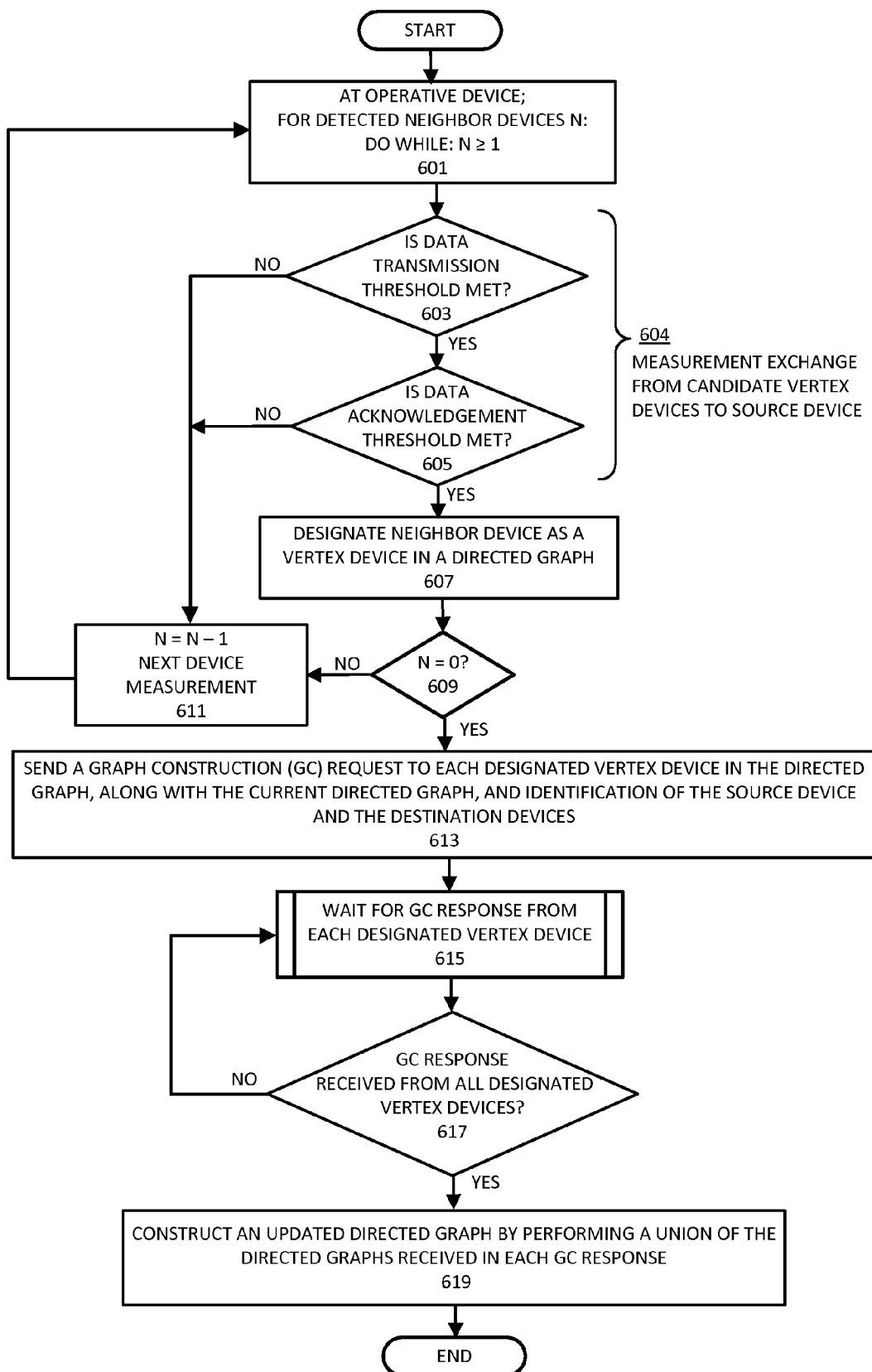
FIG. 6 is a flowchart of an example process in a source device for constructing a network directed graph in accordance with the embodiments.

The flowchart of FIG. 6 illustrates a process of constructing a network directed graph for a wireless ad hoc network such as the example wireless ad hoc network 400, in a source device such as source device 401. The process of constructing a network directed graph is the first step needed to establish a linear network code between a source device and a destination device. The FIG. 6 flowchart is described below as a process with reference to an operative device in accordance with the term definitions provided above. Therefore it is to be understood that the process will be performed by a source device and will also be performed by downstream devices (i.e. vertex devices) that assume the role of operative device when updating the network directed graph and propagating GC requests downstream in the wireless ad hoc network. Therefore, the term "operative device" is used in the present disclosure to refer to the device that is performing the operations of the described process. Accordingly, such an "operative device" may be a source device or a vertex device depending upon the circumstances of the operation.

The process begins in operation block 601, and each operative device performs wireless interface measurements of its neighbor devices and the neighbor devices measure the wireless interface to the operative device. This measurement information is then exchanged between the devices. In decision block 603, if a first threshold for data transmission is met, a second threshold for data acknowledgment is checked in decision block 605. The measurements performed by the operative device are evaluated against the first threshold and the measurements the operative device received from each neighbor device during the measurement exchange 604 are evaluated against the second threshold. If both thresholds are met for a particular neighbor device, then in operation block 607 the operative device will designate that neighbor device as a vertex device. The operative device performs this threshold testing for all of its neighbor devices until all the neighbor devices have been tested as shown in decision block 609.

If the index (i.e. the number of neighbor devices for which measurements have not been evaluated) is still greater than zero in decision block 609, then the operative device proceeds to operation block 611, decrements the index by one and continues the loop operation at operation block 601. If the first threshold in decision block 603 is not met, or if the second threshold in decision block 605 is not met, then the process also proceeds to operation block 611 decrements the index by one and continues the loop operation at operation block 601.

The requirement that the wireless interface between two devices meet the two thresholds required in decision block 603 and decision block 605 is referred to in the present disclosure as the "edge presence rule" because it is the requirement for creating an edge in the network directed graph between the operative device and the neighbor device. Put another way, an edge will be added between a first device and a second device in the network directed graph if 1) the measurement at the first device of a signal transmitted by the second device is greater than a first threshold and 2) the measurement at the second device of a signal transmitted by the first device is greater than a second threshold.

The first threshold is selected to be high enough to ensure that reliable connectivity can be maintained from the first device to the second device, and such that a fairly high data rate can be sustained from the first device to the second device. The second threshold is selected to be high enough to ensure that connectivity can be maintained from the second device to the first device and such that as fairly low data rate can be sustained from the second device to the first device. More particularly, it should be possible to reliably transmit acknowledgements and other feedback from the second device to the first device, in response to transmissions from the first device to the second device. Thus, the first threshold can be expected to be significantly higher than the second threshold. More specifically, the first threshold must be sufficient to support a QPSK (Quadrature Phase Shift Keying) modulated signal on the wireless interface between the devices. The first threshold may also be set such that a QAM (Quadrature Amplitude Modulation) signal may be supported such as 16-QAM or 64-QAM depending on the desired data rate. The second threshold with relates to acknowledgements sent from the second device back to the first device should be set such that BPSK (Binary Phase Shift Keying) modulation is supported on the wireless interface. The relative difference between the first threshold and the second threshold may be on the order of, for example, 3 dB i.e. the first threshold value is significantly higher than the second threshold value.

After the loop operation is completed such that the operative device has evaluated the two thresholds for all of its neighbor devices (i.e. N=0 in decision block 609) and has designated some of the neighbor devices as vertex devices in operation block 607, the process proceeds to operation block 613. In operation block 613, the operative device sends a graph construction request (GC request) to each designated vertex device along with the initial network directed graph constructed by the operative device. The GC request identifies the source device and the destination devices. As will be understood, during the first occurrence of the process of FIG. 6, the operative device will be the source device.

In operation block 615, the operative device waits for a response from each designated vertex device, to which the operative device sent a GC request. A "GC response" includes a version of the network directed graph from the perspective of the vertex device. More particularly, the vertex device assumes the role of "operative device," detects it neighbors, evaluates the edge presence rule for each neighbor device, and accordingly designates one or more of its neighbor devices as further vertex devices, in other words, it performs the process illustrated in FIG. 6. The vertex device updates the initial copy of the network directed graph by adding edges as needed and sends this updated directed graph back to the upstream operative device as part of the GC response.

Accordingly in decision block 617, if all vertex devices have responded to their GC requests, the operative device proceeds to operation block 619. In operation block 619, the operative device constructs an updated version of the network directed graph by performing a union of all the updated network directed graphs received from the vertex devices in the GC responses. The process then terminates as shown. If there are still outstanding GC responses from some vertex devices in decision block 617, then the process returns to operation block 615 and waits until the GC responses are received. In some embodiments, a timeout function will expire if the GC response is not received in a predetermined period of time. In that case, the designated vertex device will be considered to be unavailable by the operative device, and the operative device will accordingly remove the edge to the vertex device in the network directed graph.

Figure 7:
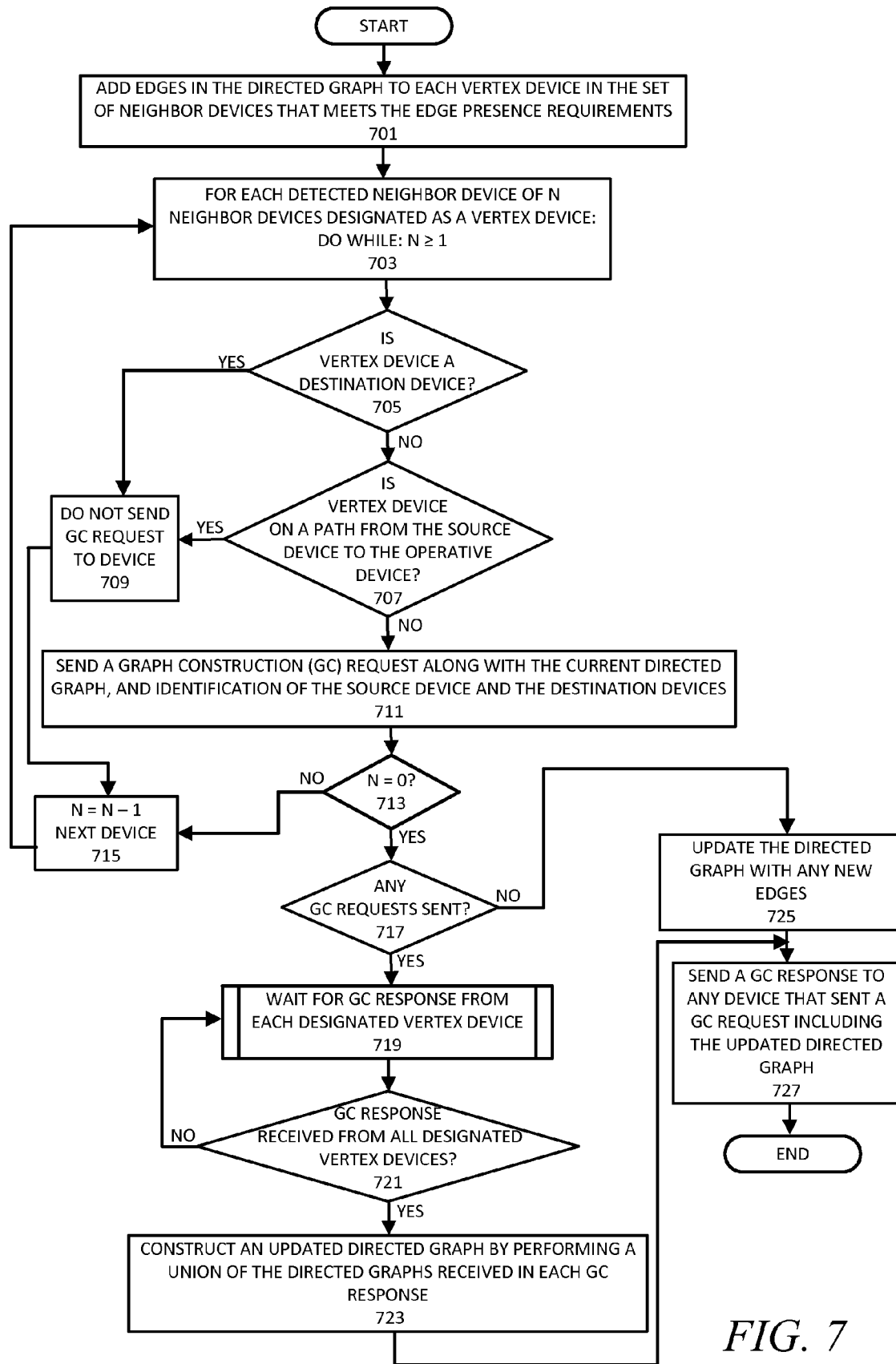
FIG. 7 is a flowchart of an example process in a vertex device for constructing a network directed graph in accordance with the embodiments.

The network directed graph is further propagated through the wireless ad hoc network to subsequent vertex devices using GC requests. FIG. 7 is a flowchart of an example process in a vertex device for constructing the network directed graph and is a continuation of the process started in FIG. 6. It is to be understood that the processes illustrated in FIG. 6 and FIG. 7 apply generically to source devices and vertex devices and thus FIG. 7 will be described with respect to an "operative device" as discussed above regarding the process of FIG. 6. Specifically, each device beginning with the source devices must perform the operations of FIG. 6 and FIG. 7. In other words, a vertex device acting on a GC request received from a source device or upstream vertex device, behaves as a source device for purposes of updating the network directed graph.

Accordingly in operation block 701 an upstream device which may have been a source device or a vertex device, updates the network directed graph by adding edges to each of its neighbor device which it designated as a vertex device. In other words, the upstream device adds an edge in the network directed graph to an neighbor device that meets the edge presence rule requirements discussed above.

In operation block 703, the operative device (i.e. source device or vertex device) performs a check of each of its neighbor devices that it designated as a vertex device. This may be done, for example, by a vertex device in response to a GC request received from a source device or an upstream vertex device. In other words, the operative device has gone through the FIG. 6 flowchart process and now performs additional checking. Specifically, the operative device checks if any of its neighbor devices are destination devices, or if they are upstream on an edge emanating from a source device. Accordingly in decision block 705, the operative device checks each device that it has designated as a vertex device, to determine if it is a destination device. If it is a destination device, the process proceeds to operation block 709 and the operative device does not send a GC request. If the designated vertex device is not a destination device in decision block 705, then the process proceeds to decision block 707 and checks if the designated vertex device is upstream such that it is on a path from the source device to the operative device. In other words, the operative device will not add an edge to the device that sent it the GC request because that device will have already tested and added the appropriate edge. Thus, if the vertex device is upstream in decision block 707, then the process proceeds to operation block 709 and the operative device does not send a GC request. Subsequently, after operation block 709, in operation block 715 the process decrements the neighbor index "N" by one, and continues the loop procedure in operation block 703 until all neighbor devices, that have been designated as vertex devices, have been checked.

If the designated vertex device being checked in decision block 705 is not a destination device, and is not a source device (or on a path from the source device) in decision block 707, then the process proceeds to operation block 711 and the operative device sends a GC request to the designated vertex device. The GC request includes the operative device's identification information, the source device's identification information, the destination devices and the operative device's copy of the network directed graph. When all designated vertex devices have been checked, the value of N will be zero in decision block 713 and the process will proceed to decision block 717.

If GC requests were sent to designated vertex devices at decision block 717 (i.e. if there were downstream vertex devices), then the operative device waits for a GC response from each designated vertex device as shown in operation block 719. As GC responses are received, the operative device checks if there are still outstanding GC responses in decision block 721. If yes, then the operative device continues to wait in operation block 719. A timer will also be set for each GC response. If the GC response is not received with the predetermined time period of the timer, then the corresponding vertex device will be presumed to be unavailable and will not be added to the network directed graph. After all the GC responses are received or have timed out at decision block 721, the process proceeds to operation block 723. In operation block 723, the operative device will construct an updated network directed graph by performing a union of the network directed graphs received in each GC response. In operation block 727, the operative device will send a GC response to any upstream devices that sent a GC request including the updated network directed graph. The process then terminates as shown.

If there were no GC requests sent at decision block 717, then the process proceeds to operation block 725 and the operative device updates the network directed graph with any necessary new edges. If there were no designated vertex devices, then the edges added in operation block 725 will be to destination devices. In operation block 727, the operitive device will send a GC response to any upstream devices that sent a GC request. The GC response will include the updated network directed graph. The process then terminates as shown.

Figure 8:
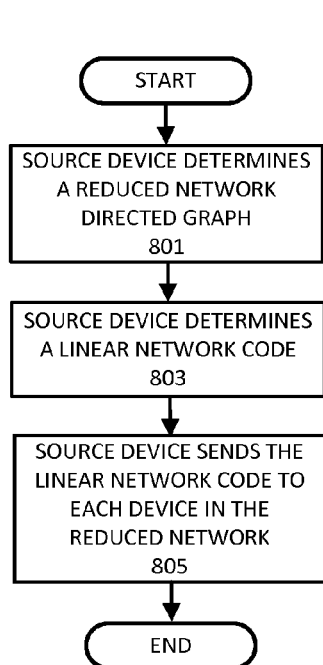
FIG. 8 is a flowchart of an example process in a source device for propagating a linear network code to all network devices in accordance with the embodiments.

In the example process of FIG. 8, the source device propagates a linear network code to all network devices. After the source device receives all of the GC responses from devices to which it send corresponding GC requests, the source device determines an updated network directed graph as the union of the various network directed graphs it received in the GC response. In operation block 801, the source device determines a reduced network directed graph.

More particularly, in operation block 801 a source device s computes the reduced network $Y_R=(V, E_R, s, T)$ and, in operation block 803, computes a linear network code for multicast (also referred to as a linear code multicast or "LCM") from s to T denoted $LCM_{s \to T}=[s, T, V, E_g, EV, \{G_{t_1}, G_{t_2}, \ldots, G_{t_n}\}, F]$, where:

i) F is a Galois Field;
ii) r is the number of packets that can be multicast from the source device s to each destination device $t \in T$ in one use of the reduced network, i.e., the linear network code capacity;
iii) EV is an assignment of length r vectors of elements of F to each edge in $E_R$; and
iv) $G_{t_1}, G_{t_2}, \ldots, G_{t_n}$ are the global transfer matrices of the destination devices $t_1, t_2, \ldots, t_n \in T$.

In operation block 805, the source device s sends the linear network code "$LCM_{s \to T}$" to each device u to which there is a corresponding edge from vertex s to u. The linear network code $LCM_{s \to T}$ is propagated to each device with a corresponding vertex in the reduced network directed graph $Y_R$. Each device, other than the destination devices, that receives the linear network code computes and stores the local transfer matrix "$L_u$." Each destination device $t_i \in T$ stores its global transfer matrix "$G_{t_i}$."

At that point, the wireless ad hoc network is established, and packet data can be sent from the source devices to the destination devices. The device-to-device connectivity in the ad hoc network may be updated from time-to-time. For example, if an edge between an operative device and a downstream device that was previously included in a GC response no longer meets the edge presence rule requirements, the operative device will send a GC response update to the source device or to an upstream device, indicating that the edge is no longer present. The source device will accordingly update the network directed graph and revise the linear network code if needed.

Figure 9:
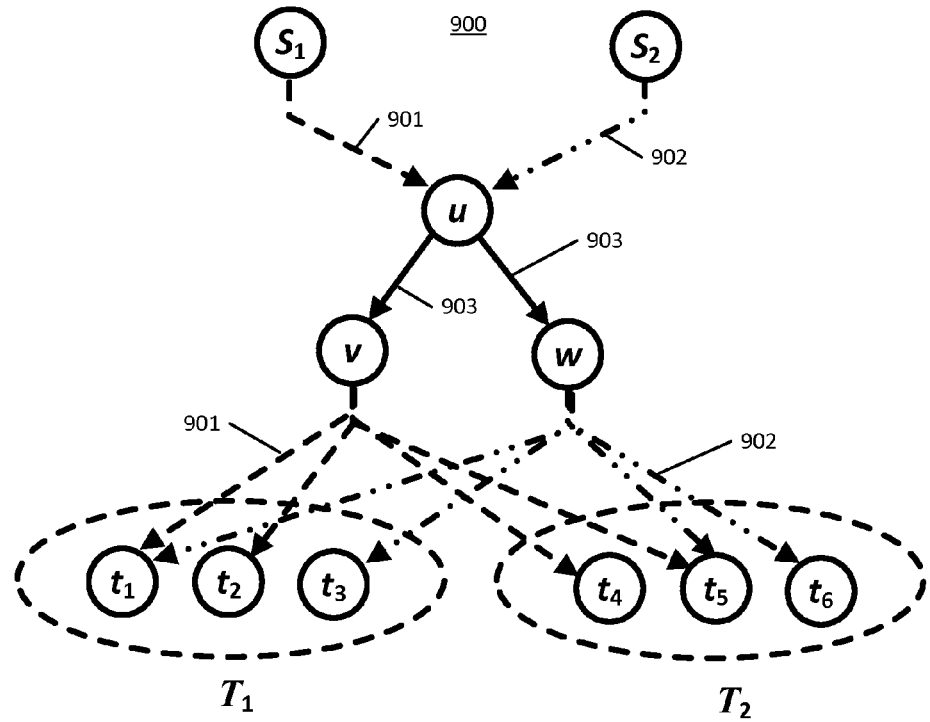
FIG. 9 is a network diagram with multiple source devices where each source device determines a separate linear network code in accordance with an embodiment.

Utilizations of the above processes to establish various wireless ad hoc network configurations will now be described. One such ad hoc network configuration is shown in FIG. 9 which is a network diagram with multiple source devices where each source device determines a separate linear network code in accordance with an embodiment.

The ad hoc network 900 represents a multi-stream transmission and more particularly a many-to-many transmission of packet data. In other words, in the network 900, instead of there being only one source device in the network, there are multiple source devices $s_1, s_2 \ldots, s_k \in V$. Likewise there are corresponding sets of destination devices sets designated as $T_1$ such that $T_1, T_2, \ldots T_k \subseteq V$. Each source device $s_i$ transmits a stream of packets to each destination device in a set of destination devices. i.e. $t \in T_i$. In the network 900, $s_1$ and $s_2$ represent two source devices and $T_1$ and $T_2$ represent two sets of destination devices. The source device $s_1$ constructs a first linear network code 901 ("$LCM_{s_2 \rightarrow T_1}$") which is represented by a first style of dashed line. The source device $s_2$ constructs a second linear network code 902 ("$LCM_{s_2 \rightarrow T_2}$") which is represented by a second style of dashed line. The common vertex device "u" is utilized by both the first linear network code 901 and the second linear network code 902. However packets that arrive at vertex device u from source devices and source device $s_1$ are not linearly combined prior to retransmission. Instead the vertex device u determines checks the packet header of each received packet and determines which linear network code to apply to the packet. The vertex device u then applies the correct corresponding local transfer matrix and generates the outgoing packets.

Figure 10:
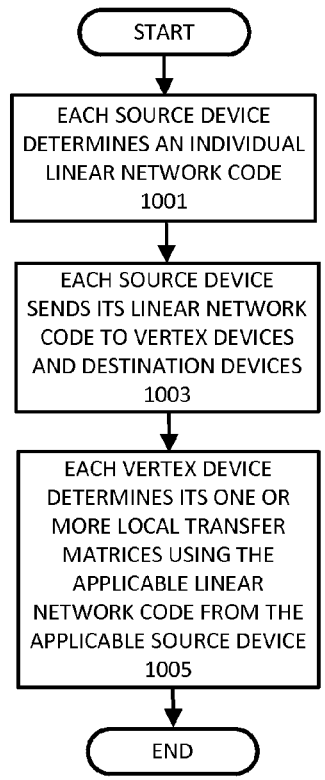
FIG. 10 is a flowchart of an example process in a source device in the network illustrated in FIG. 9 in accordance with an embodiment.
Figure 11:
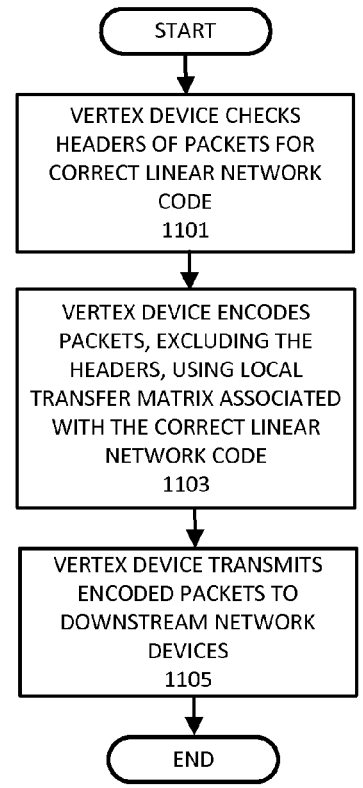
FIG. 11 is a flowchart of an example process in a vertex device in the network illustrated in FIG. 9 in accordance with an embodiment.

The network 900 operates in accordance with the processes illustrated in FIG. 10 and FIG. 11. FIG. 10 provides an example process in source device $s_1$ and source device $s_2$ in accordance with an embodiment. It is to be understood that the example network 900 is shown having two source devices for clarity of explanation however a network may have multiple source devices. In operation block 1001, each source device determines an individual linear network code. More particularly, in the network 900, for each $s_i$ a linear network code is computed such that:

$$LCM_{s_1 \rightarrow T_1} = [s_i, T_i, V, E_{g,i}, r_i, EV_i, \{G_{r_1}^i, G_{r_2}^i, \ldots, G_{t_n}^i\}, F].$$

In operation block 1003, source device s and source device $s_2$ each independently send their respective linear network codes to the vertex devices u, v, and w, and to the destination devices in destination device sets $T_1$ and $T_2$. That is, the linear network codes are sent to each reachable device corresponding to a vertex in V via edges in $E_{R,i}$. In operation block 1005, the devices compute their respective local transfer matrices $L_{u,i}$ in response to receiving the linear network codes. Accordingly, the network 900 devices are configured for network coding for all linear network codes (i.e. for each $LCM_{s_1 \rightarrow T_1}$) from each source device. Put another way, the network 900 devices are configured with multiple local transfer matrices, one for each linear network code for each source device from which the device may receive packet data transmission.

After propagation of the linear network codes and corresponding configuration of devices, packet data transmissions may occur from the source devices to the destination devices. As each source device generates packet data fragments to be transmitted, packet headers are added that identify the linear network code used to encode the packet's data payload. The packets are thus transmitted according to their respective linear network codes (i.e. $LCM_{s_1 \rightarrow T_1}$). Operation of the vertex devices in the network 900 is illustrated in the example process shown in FIG. 11. In operation block 1101, as packets are received from upstream devices, the vertex devices check the packet headers to determine the correct linear network code to apply. Therefore, in operation block 1103, a vertex device performs linear network code computations corresponding to the linear network code indicated in the packet header (i.e., the header is not included in the LCM computation), on the suite of payloads received. The vertex device then inserts the header and transmits the packet as required by the applicable linear network code. In operation block 1105, the vertex, device transmits each encoded packet on the corresponding edge to the corresponding downstream device according to the applicable linear network code.

In some embodiments, a network device that is involved in more than one linear network code may need to transmit packets for the linear network codes sequentially or may use a time-division multiplexing (TDM) approach in which packets from alternating linear network codes are transmitted sequentially. Thus in the example network 900, vertex u may receive data packets from source devices encoded by a first linear network code 901 and from source device $s_2$ encoded by a second linear network code 902. Vertex device u processes the data packets accordingly and forwards them on over the paths 903 winch may utilize either linear network code 901 or linear network code 902. The downstream vertex devices v and w receive, the data packets and check the packet headers. Thus for example, vertex devices v may forward on data packets to destination devices $t_1$ and $t_2$ using linear network code 901, and to devices $t_4$ and $t_5$ using linear network code 902.

Another example ad hoc network configuration is shown in FIG. 12 which shows a network 1200 having two source devices and a common vertex device in accordance with an embodiment. Operation of the example network 1200 is illustrated in FIG. 13 which describes an example process in a source device, and FIG. 14 which describes an example process in a destination device.

Turning to FIG. 13 and operation block 1301, source device $s_1$ and source device $s_2$ identify a common vertex device "c" such that each source device has a path 1201 to vertex device c, and such that vertex device c has paths to each destination device within the device sets $T_1$ and $T_2$. In operation block 1303, the common vertex device constructs a linear network code between itself and the destination devices. More particularly, the common vertex device c constructs a linear network code $LCM_{c \rightarrow UT_i}$ with capacity r, where r represents the number of packets that can be simultaneously sent to each destination device. In operation block 1305, packets are routed, without any network coding, from each source device over the paths 1201 to the common vertex device c. The common vertex device c accumulates r data packets and performs a network-coded transmission according to the common vertex device linear network code, i.e. $LCM_{c \rightarrow UT_i}$. The data packets are forwarded on over paths 1202 to downstream vertex devices v and w which forward on the data packets over paths 1203 and paths 1205, respectively, making use of the common vertex device linear network code.

In operation block 1401, a destination device may receive packets from either source device $s_1$ or source device in operation block 1403, the destination devices will decode the packets using the common vertex device linear network code. In operation block 1405, each destination device will discard any data packets that are not addressed to it (i.e. that are intended for a different destination device). Thus in the example network 1200, data packets are Seal, from source device $s_1$ and source device $s_2$ to the common vertex device c which performs network-coded transmission of r packets received from source device $s_1$ and source device $s_2$. Each destination device $t_1$ in the union of destination device sets $T_1$ and $T_2$ receives network-coded data packets and recovers the original packets from source device $s_1$ and source device $s_2$ by using the global transfer matrix for the common vertex device c linear network code. A destination device in $T_1$ then discards any data packets it received that were addressed to destination devices in $T_2$.

Figure 15:
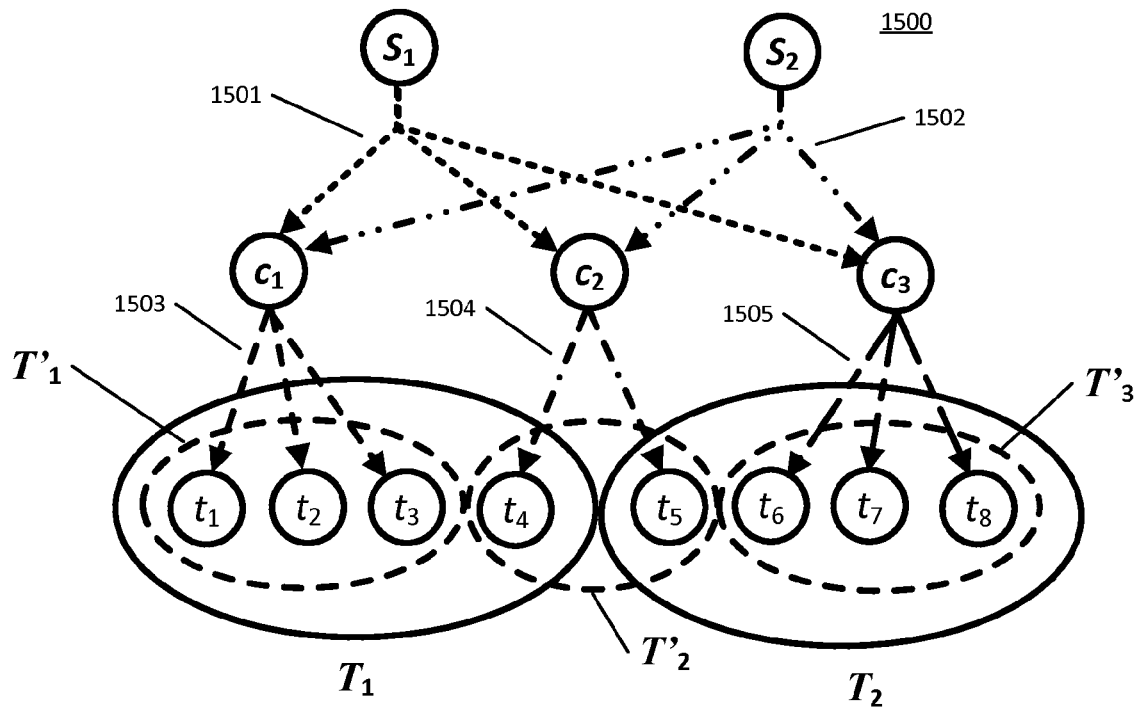
FIG. 15 is a network diagram of a network having two tiers of linear network coding in accordance with an embodiment.
Figure 16:
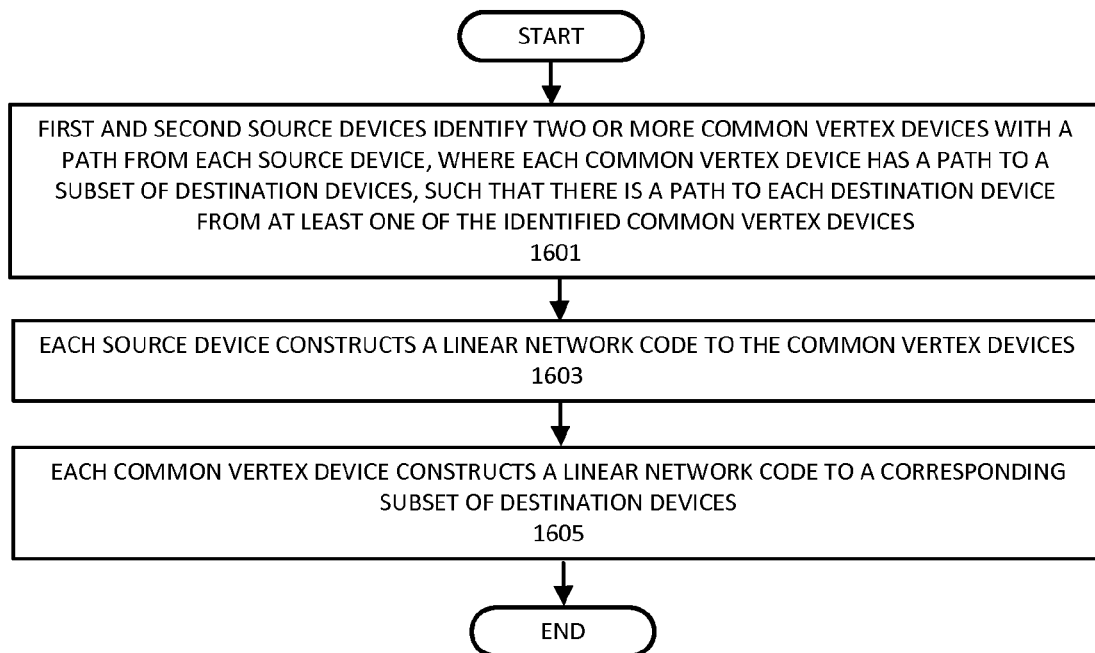
FIG. 16 is a flowchart of an example process in a source device in the network illustrated in FIG. 15 in accordance with an embodiment.

Another example ad hoc network, configuration is shown in FIG. 15 which shows a network 1500 having two tiers of linear network coding in accordance with an embodiment. Operation of the example network 1500 is illustrated in FIG. 16 which describes an example process of assembling the ad hoc network. In the network 1500, source device $s_1$ and source device $s_2$ each independently compute a linear network code to several common vertex devices $c_1$, $c_2$, and $c_3$. For example, source, device $s_1$ computes linear network code 1501 to common vertex devices $c_1$, $c_2$, and $c_3$ and source device $s_2$ computes linear network code 1502 to vertex devices $c_1$, $c_2$, and $c_3$. Linear network code 1501 and linear network code 1502 are illustrated in FIG. 15 as edges having different style dotted lines. Two destination device sets $T_1$ and $T_2$ are present in the ad hoc network 1500 with set $T_1$ including destination devices $t_1$, $t_2$, $t_3$, and $t_4$, and set $T_2$ including destination devices $t_5$, $t_6$, $t_7$, and $t_8$. Each of the common vertex devices can only communicate with a subset of the destination devices. For example, common vertex device $c_1$ can only communicate with subset $T_1$ which includes destination devices $t_1$, $t_2$, and $t_3$; common vertex device $c_2$ can only communicate with subset $T_2$ which includes destination devices $t_4$ and $t_5$; and common vertex device $c_3$ can only communicate with subset $T_3$ which includes destination devices $t_6$, $t_7$, and $t_8$. In the example network 1500, source device $s_1$ transmit packets to destination devices $T_1$ and device $s_2$ transmits packets to destination devices $T_2$.

Turning to FIG. 16 and operation block 1601, source device $s_1$ and source device $s_2$ identify the common vertex devices $c_1$, $c_2$, and $c_3$ based on each common vertex device having a path from both source devices and such that each source device has a path to all destination devices by way of the common vertex devices. In Operation block 1603 each source device constructs a linear network code to the common vertex devices (i.e. source device $s_1$ computes linear network code 1501 to common vertex devices $c_1$, $c_2$, and $c_3$ and source device $s_2$ computes linear network code 1502 to vertex devices $c_1$, $c_2$, and $c_3$). In operation block 1605, each common vertex device constructs a linear network code to a corresponding subset of destination devices. For example, common vertex device $c_1$ constructs linear network code 1503 to subset $T_1$ which includes destination devices $t_1$, $t_2$, and $t_3$; common vertex device $c_2$ constructs linear network code 504 to subset $T_2$ which includes destination devices $t_4$ and $t_5$; and common vertex device $c_3$ constructs linear network code 1505 to subset $T_3$ which includes destination devices $t_6$, $t_7$, and $t_8$. The process of constructing the linear network codes includes construction of a network directed graph as was discussed above with respect to the processes of FIG. 6 and FIG. 7.

It is to be understood that the example network 1500 illustrates two source devices and three common vertex devices for clarity of explanation but that any number of source devices and common vertex devices (as well as destination devices) can be used to form the ad hoc network. Thus, more generally in the case of a two-tier network coding approach as illustrated in FIG. 15, the source devices initially communicate with each other over the wireless interface and identify a group of common vertex devices $c_1$, $c_2$, . . . , $c_i$ such that there is a communication path from each source device $s_i$ to each common vertex device $c_i$, and such that there are communication paths from each common vertex device $c_k$ to each destination device $t \in T'_k$, such that $U_k T'_k = U_i T_i$. Put another way, the common vertex devices are selected such that each source device can form a communication path to each destination device to which it needs to send data packets. Each source device $s_i$, then constructs a linear network code to each common vertex device (i.e. $LCM_{s_i \to (c_1, c_2, \ldots, c_i)}$) with linear network code capacity $r_i$. The linear network codes are then propagated through any other intermediary vertex devices to the common vertex devices and each of these devices are configured using the linear network code accordingly.

Each common vertex device $c_k$ then constructs as linear network code $LCM_{c_k \to T'_k}$ with capacity $r'_k$ to its corresponding subset of destination devices. The common vertex device linear network codes are then propagated through any other intermediary vertex devices and to the corresponding subset of destination devices and each of these devices are configured using the linear network code accordingly. In operation of the ad hoc network, each source device $s_i$ performs network coding of $r_i$ packets and inserts a header identifying the source device and the destination devices. The source device then transmits the network-coded packets according to the linear network code (i.e. $LCM_{s_1 \to (c_1, c_2, \ldots, c_i)}$). Any intermediate vertex devices along the paths make use of the linear network code to perform the network coding operations accordingly as required. If any such intermediate vertex device receives packets that correspond to more than one linear network code, the vertex device will process the packets sequentially such that packets of different linear network codes are not mixed.

At the common vertex devices, each common vertex device $c_k$ recovers the transmissions from one or more source devices and performs network coding of $r'_k$ received packets according to the Common vertex device's linear network code to its corresponding subset of destination devices (i.e. $LCM_{c_k \to T'_k}$). Each common vertex device $c_k$ ensures that the $r'_k$ that it performs network coding on have destination devices that are in its corresponding subset of destination devices $T'_k$ (i.e. $c_k$ performs network coding of any $T'_k$ received packets intended for $t \in T_k$ but received from any of $s_1$, $s_2$ . . . , $s_k$). The network coding operations are performed only on the data packet payload and not on the packet header. The common vertex devices then transmit the network-coded packets with a header indicating the source device that initially sent the packet.

Each destination device in the corresponding subset of destination devices (i.e. $t \in T'_k$) receives the network-coded packets for the linear network code (i.e. $LCM_{c_k \to T'_k}$) of a corresponding common vertex device and recovers the data packets using the corresponding global transfer matrix for the linear network code. It is to be understood that the destination device subsets $T'_1, T'_2, \ldots, T'_i$ are not necessarily disjoint sets, and that therefore a destination device may receive the same packet via more than one linear network code.

Figure 17:
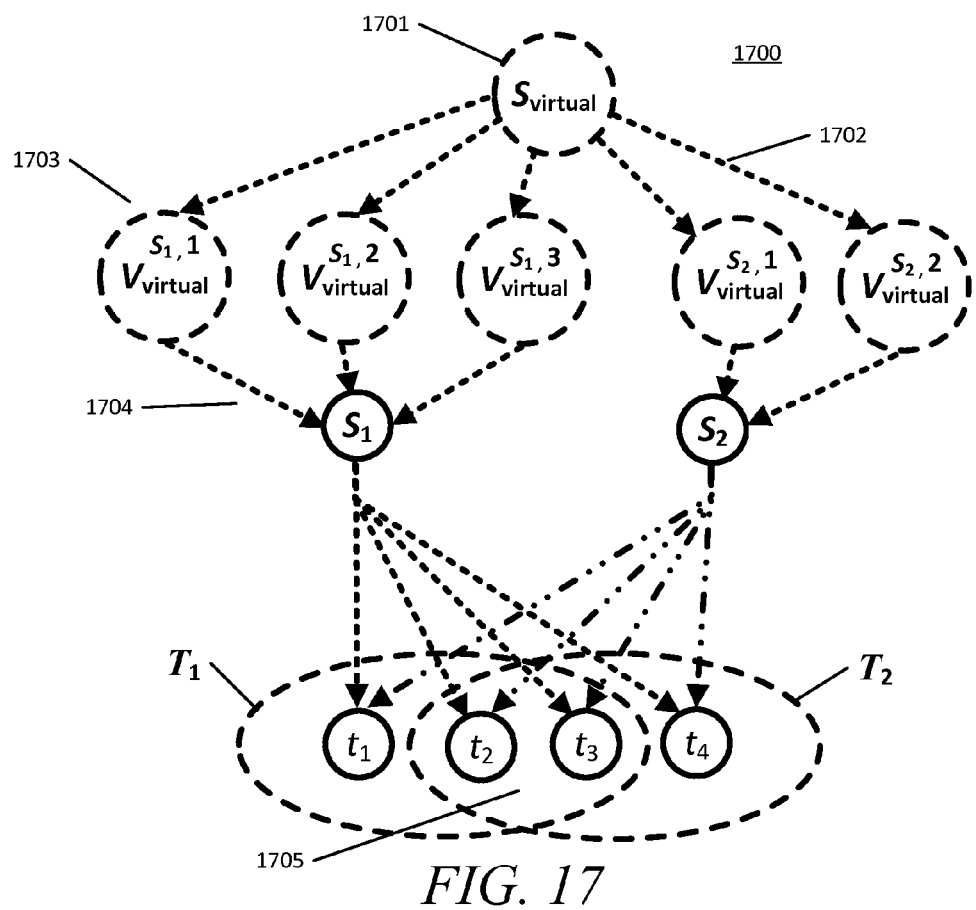
FIG. 17 is a network diagram of a network having a virtual source device and virtual vertex devices in accordance with an embodiment.

Another example ad hoc network configuration is shown in FIG. 17 which shows a network 1700 having a virtual source device and virtual vertex devices in accordance with an embodiment. The example ad hoc network 1700 includes a virtual source device 1701 and a linear network code 1702 front a group of virtual vertex devices to source device $s_1$. The term "virtual device" as used in the present disclosure refers to a mathematical construct rather than an actual network device. These mathematically constructed virtual source devices and virtual vertex devices provide advantages in linear network coding as described below.

Figure 18:
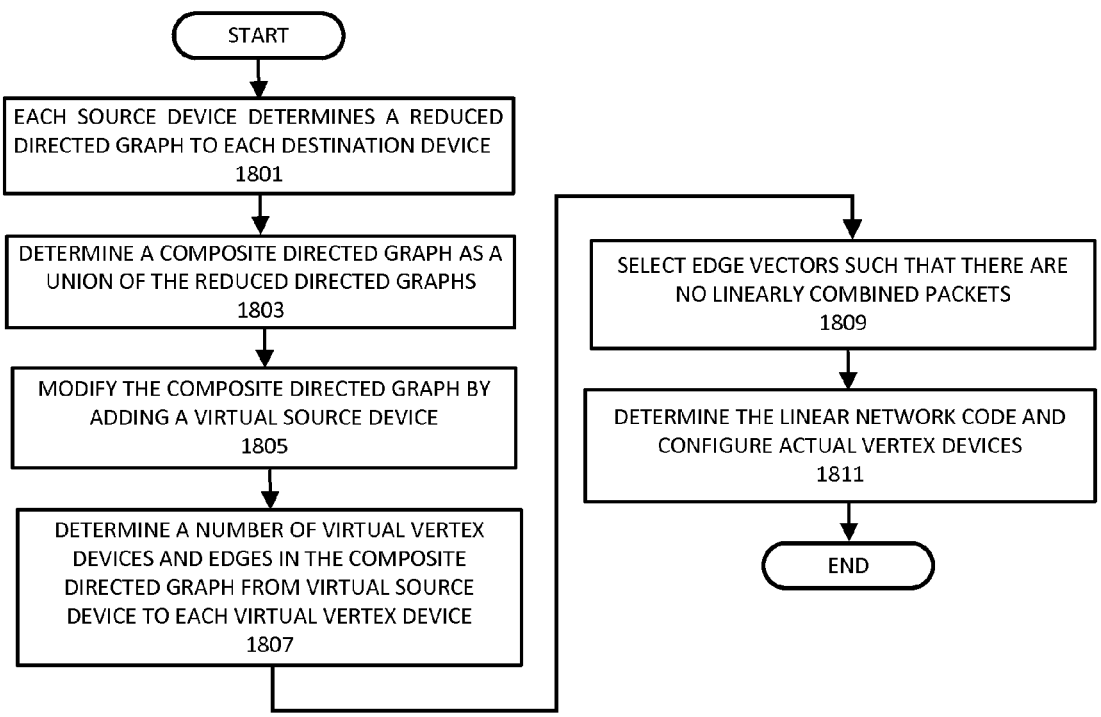
FIG. 18 is a flowchart of an example process in the network illustrated in FIG. 17 in accordance with an embodiment.

Operation of the example network 1700 is illustrated in FIG. 18 which describes an example process of assembling the ad hoc network. Turning to FIG. 18 and operation block 1801, source device $s_1$ and source device s each determine, a reduced network directed graph. All destination devices are considered. i.e. $T=UT_i$ is computed. For each source-destination device pair $(s_i, T)$, a reduced network directed graph $Y_{R,i}=(V, E_{R,i}, s_i, T_i)$ is constructed. The value a $r_i=\min\{\mathrm{mincut}(s_i,t)|t \in T\}$ is computed for each source device $s_i$. In operation block 1803, a composite network directed graph is determined as the union of the reduced graphs $Y_{R,Union}=(V, E_{R,Union})$ where $E_{8,Union}$ is the union of $E_{R,i}$. In operation block 1805, the composite network directed graph is modified by adding a virtual source device 1701. The composite network directed graph $Y_{R,Union}$ is modified by first adding a virtual source device $S_{virtual}$. Then, in operation block 1807, a set of virtual vertex devices $V_{virtual}$ are added, where the number of added virtual vertex devices $|V_{virtual}|=\min\{r_i|r_i=\min\{\mathrm{mincut}(s_i, t)|t \in T\}\}$. The set of virtual vertex devices $V_{virtual}$ is partitioned into non-overlapping sets of virtual vertex devices $V_{virtual}^{s_i}$. In operation block 1807, virtual edges are added from the virtual source device $S_{virtual}$ to each virtual vertex device in the set $V_{virtual}$. Virtual edges are added from each virtual vertex device $V_{virtual}^{s_i}$ to the source devices $s_i$. For example, edge 1704 is added from the virtual vertex device 1703 lo source device $S_1$. The resulting network directed graph is $G_U=(V_U, E_U)$, where:

i. $V_U=V \cup \{s_{virtual}\} \cup V_{virtual}$, and
ii. $E_{520} = E_{R,Union} \cup \{(S_{virtual}, v_{virtual})|V_{virtual} \in V_{virtual}\} \cup \cup_i \{(S_{virtual}, v_{virtual}^{s_i})|v_{virtual}^{s_i} \in V_{virtual}^{s_i}\}$.

A reduced network directed graph $Y_{R,U}=(V_U, E_{R,U}, s_{virtual}, T)$ is constructed from $G_U$. Let $r_U=\min\{\mathrm{mincut}(s_{virtual}, t)|t \in T\}$. In operation block 1809, for each edge $(s_{virtual}, v_{virtual})$ present in $E_{R,U}$, an edge vector is chosen such that it carries a packet that is not linearly combined. That is, the edge vector $EV(s_{virtual}, v_{virtual})=[\alpha_1, \alpha_2, \ldots]$ is chosen such that $\alpha_k=1$ for some k, and $\alpha_l=0$ for all $l \neq k$. In operation block 1811, the linear network code from the virtual source device 1701 to the destination devices 1705 is then constructed (i.e. $LCM_{s_{virtual} \to T}$) with the above restrictions placed on edges $(s_{virtual}, v_{virtual}^{s_i,k})$. Edges $(s_{virtual}, v_{virtual}^{s_i})$ in the linear network code $LCM_{s_{virtual} \to T}$ carry non-linearly combined packets. Furthermore, edges $(v_{virtual}^{s_i}, s_i)$ also carry non-linearly combined packets since the virtual vertex $v_{virtual}^{s_i}$ has a single inbound edge and a single outbound edge, although edge $(v_{virtual}^{s_i}, s_i)$ may have an edge vector that results in the inbound packet to $v_{virtual}^{s_i}$ not being identical to the outbound packet from $v_{virtual}^{s_i}$. Also in operation block 1811, network devices that are intermediate between the virtual source device and the destination device are configured with the linear network code. $LCM_{s_{virtual} \to T}$.

For each $s_i$, the inbound edges to the source device $s_i$ are defined as $In(s_i)$ such that each source device $s_i$ transmits $|In(s_i)|$ packets. The packets that are transmitted by the source device $s_i$ are computed as follows. For each edge $e=(v_{virtual}^{s_i}, s_i), e \in In(s_i)$, a source device $s_i$ chooses a packet p that it has generated. The source device $s_i$ performs computations on packet p that are to be performed by the (virtual) vertex $v_{virtual}^{s_i}$. It is to be understood that due to the restrictions placed on the edge vectors (i.e. they are chosen such that it carries a packet that is not linearly combined), these computations do not require the source device $s_i$ to have knowledge of the packets of any other device. The computed packets are then transmitted. Each intermediate device in the linear network code $LCM_{s_{virtual} \to T}$ performs network coding operations as required by the linear network code. Each destination device discards packets that are not addressed to it.

Among other advantages of the virtual source approach illustrated in FIG. 17, there is no multiplexing needed at intermediate network devices. As another advantage, there is no network coding required between the source devices and intermediate devices.

Figure 19:
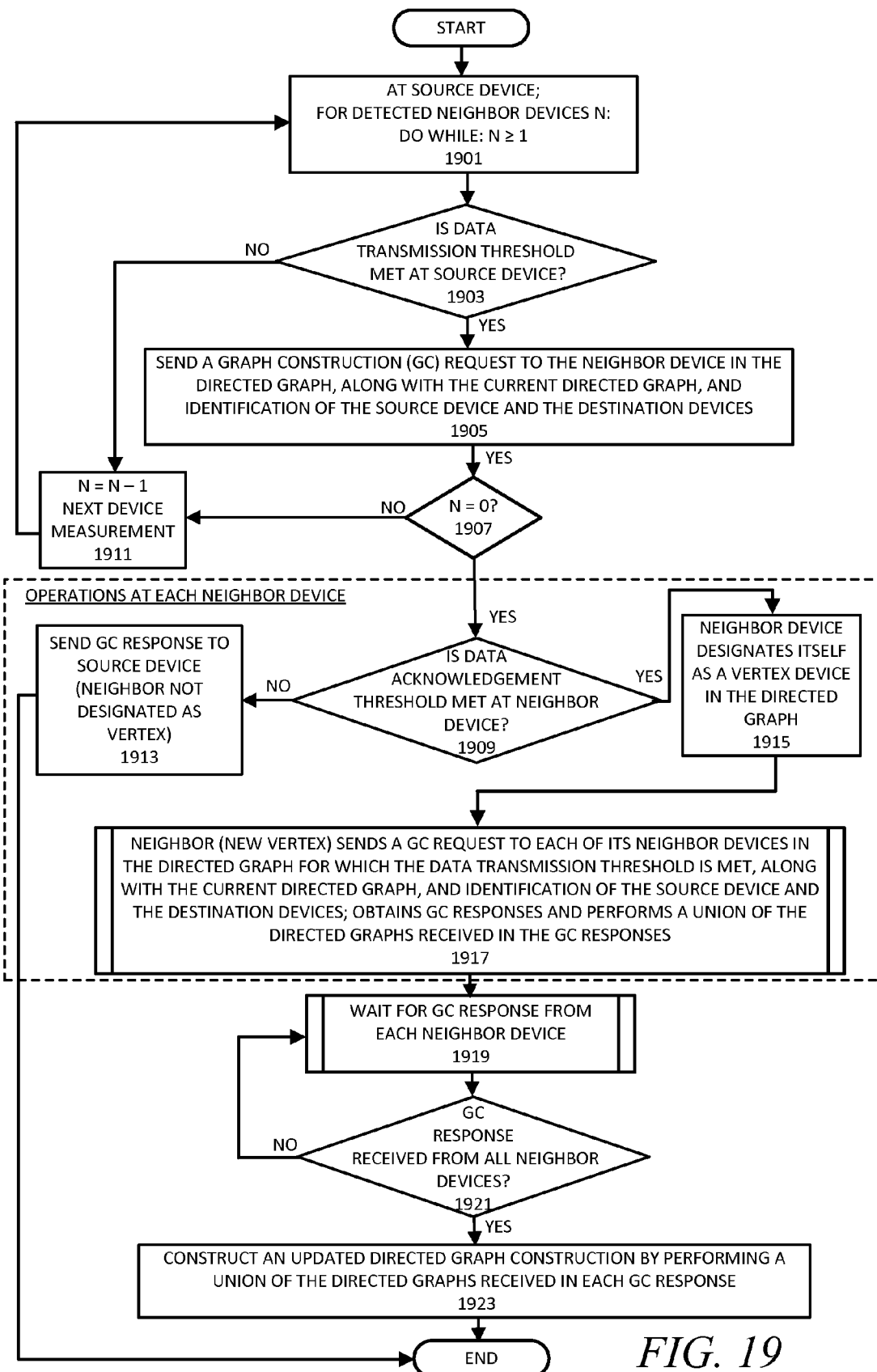
FIG. 19 is a flowchart of an example process for constructing a network directed graph in accordance with an embodiment.

Turning to FIG. 19, an example alternative process for constructing a network directed graph in accordance with an embodiment is illustrated. In the process illustrated in FIG. 19, the devices do not need perform the measurement exchange 604 required in the process of FIG. 6. It is to be understood that the process illustrated in FIG. 19 applies generically to source devices and vertex devices; however FIG. 19 will be described with respect to a "source device" for clarity of explanation. The process of FIG. 19, when used, would be performed by the source device as well as downstream vertex devices until the wireless ad hoc network is defined.

The process begins in operation block 1901, and each source device scans for neighbor devices and begins a loop operation to measure the wireless interface for each detected neighbor device. In decision block 1903, the source device performs wireless interface measurements of a neighbor device and checks whether a first threshold for data transmission is met. If the first threshold for data transmission is met for a particular neighbor device, then in operation block 1905 the source device will send a GC request to that neighbor device along with the initial network directed graph constructed by the source device. The GC request also identifies the source device and the destination devices.

The process then proceeds to decision block 1907 and if the index (i.e. the number of neighbor devices) is still greater than zero, then the source device proceeds to operation block 1911, decrements the index by one and continues the loop operation at operation block 1901. If the first threshold in decision block 1903 is not met, then the process also proceeds to operation block 1911 decrements the index by one and continues the loop operation at operation block 1901. In other words a GC request is not sent to a neighbor device that does not meet the first threshold.

After the loop operation is completed such that the source device has evaluated the first threshold for all of its neighbor devices (i.e. N=0 in decision block 1907), then the process proceeds to decision block 1909. The operation of decision block 1909 is performed by the neighbor device rather than by the source device. More particularly, in decision block 1909 the neighbor device measures the source device wireless interface and determines if the measurement is greater than a second threshold. In some embodiments, if the second threshold is not met, then in operation block 1913 the neighbor device may send a GC response to the source device indicating that the neighbor device is not designated as a vertex device. The process then terminates as shown.

However, if the second threshold is met in decision block 1909, then in operation block 1915 the neighbor device designates itself as a vertex device. In operation block 1917, the neighbor device performs the same operations of FIG. 19 (i.e. the neighbor device becomes the operative device in FIG. 19) for its own respective neighbor devices, sends a GC request to each neighbor device that met the first threshold, obtains responses and performs a union of the received network directed graph updates.

In operation block 1919, the process of the source device is shown and the source device waits for a response from each neighbor device to which the source device sent a GC request. As described above, a GC response includes a version of the network directed graph from the perspective of the vertex device. In decision block 1921, if all neighbor devices have responded to their GC requests, the source device proceeds to operation block 1923. In operation block 1923, the source device constructs an updated version of the network directed. graph by performing a union of all the updated network directed graphs received from the neighbor devices in the GC responses. The process then terminates as shown. If there are still outstanding GC responses from some neighbor devices in decision block 1921, then the process returns to operation block 1919 and waits until the GC responses are received. In some embodiments, a timeout function will expire if the GC response is not received in a predetermined period of time. In that case, the neighbor device will be considered to be unavailable by the source device, and the source device will accordingly not add any edge to that neighbor device in the network directed graph. The devices utilizing the process of FIG. 19 also utilize the process of FIG. 7 such that GC requests are not sent to destination devices or upstream vertex devices.

Figure 20:
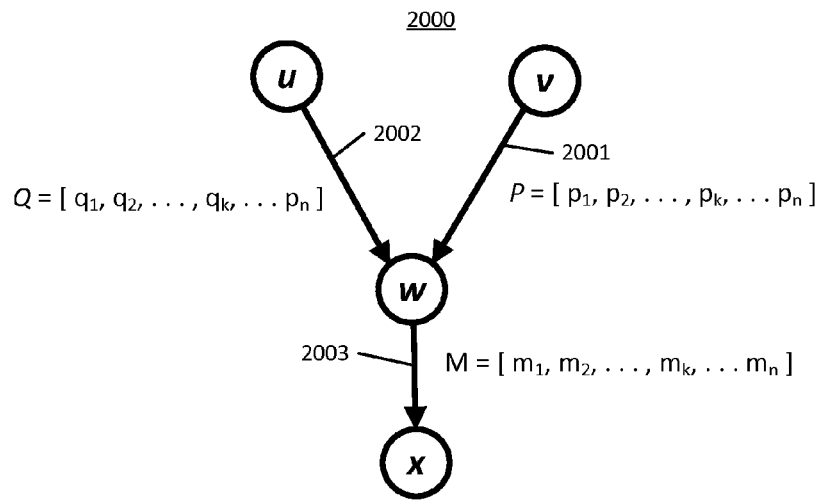
FIG. 20 is a network diagram illustrating how packets are handled in accordance with the embodiments.

FIG. 20 is a network diagram illustrating how packets are handled in accordance with the embodiments. In the various ad hoc network configurations described above, packets can have varying sizes. The network graph 2000 addresses how packets of different sizes are handled in an ad hoc network when performing network coding in accordance with the embodiments. Because the network coding operations are performed in a Galois Field F in the various embodiments, packets that are handled at the devices need to be broken down into data fragments, such that each data fragment is $\log_2 |F|$ bits long.

Accordingly, a packet "P" is treated as a sequence of packet data fragments, $p_1, p_2, \ldots, p_n \in F$, which are constructed by taking $\log_2 |F|$ successive bits of P and determining its value in base $|F|$. Each source device, represented in FIG. 20 as nodes "u" and "v," includes a header in each packet data fragment that indicates the length of the original packet P. At an intermediate device, represented as node "w," the network coding operations are performed as illustrated in FIG. 20. For example, if device w receives two packets. $P=[p_1, p_2, \ldots, p_k, \ldots p_n]$ on edge 2001 from device v and $Q=[q_1, q_2, \ldots, q_k]$ on edge 2002 from device u, then device w will transmit on edge 2003 a network coded packet $M=[m_1, m_2, \ldots, m_k, \ldots, m_n]$, where $m_i=L_w[l_i, q_i]$ for $i \leq k$ and $m_i=L_w[p_i, 0]$ for $i>k$. In other words, device w encodes packet data, fragments from both packets P and Q using the local transfer matrix until all packet data fragments have been transmitted to device x. The destination devices receive and decode packets according to the global transfer matrices. Subsequently, based on the length of the packets indicated in the headers, the packets are truncated to the correct size.

Figure 21:
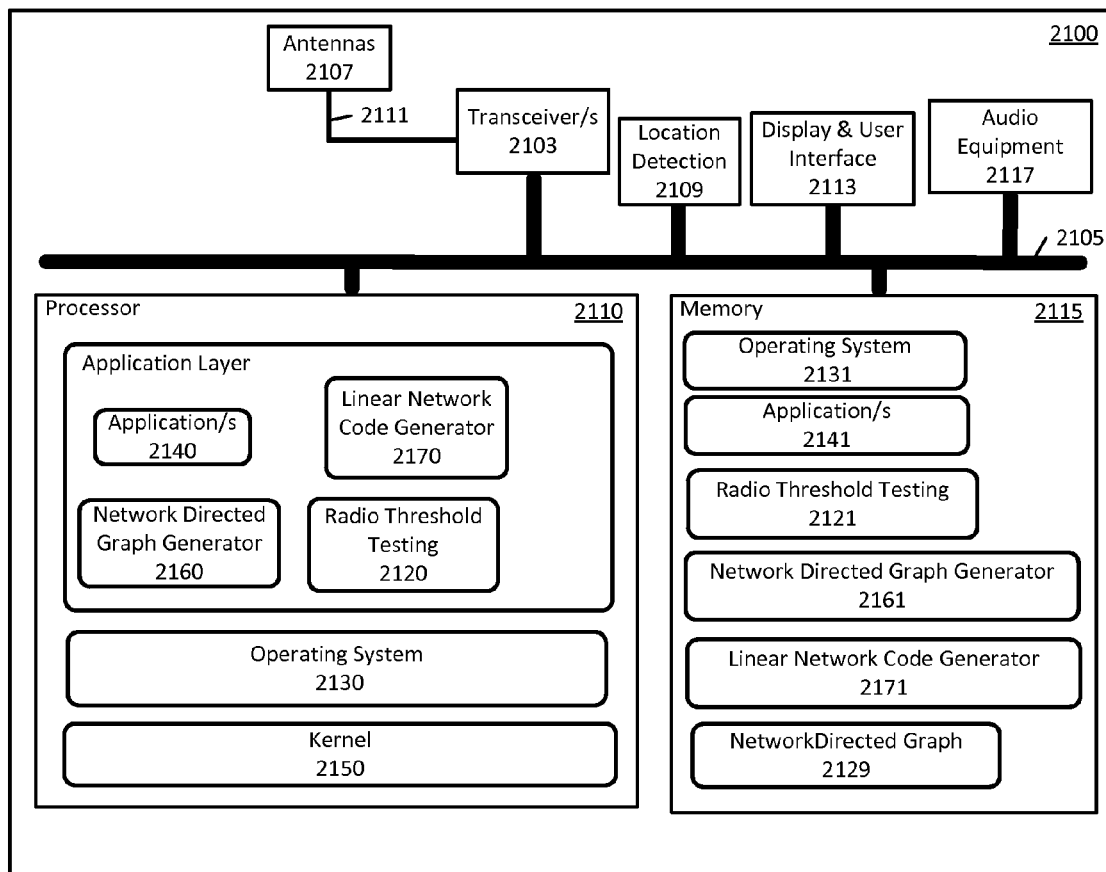
FIG. 21 is a block diagram of an example network device, which may be a source device, vertex device, or destination device, in accordance with an example embodiment.

Another example mobile device 2100 is illustrated in FIG. 21. The example mobile device 2100 includes at least one internal communication bus 2105 which provides operative coupling between various components. Each of the various components of the mobile device 2100 that are operatively coupled to the communication bus 2105 may accordingly send information to, or receive information from, a processor 2110. In addition to the processor 2110, the mobile device 2100 components include, but are not limited to, transceivers 2103, antennas 2107, location detection logic 2109 (such as, but not limited to, a GPS receiver), display and user interface 2113, non-volatile non-transitory memory 2115, and audio equipment 2117. The location detection logic 2109 may not be present in all embodiments. The antennas 2107 are operatively coupled to the transceivers 2103 by RF coupling 2111.

The processor 2110 is operative to execute instructions (also referred to herein as "executable instructions," "executable code" or "code") stored in memory 2115, including operating system executable code 2131 to run at least one operating system 2130, a kernel 2150, and an application layer 2180 (or "user space") in which applications executable code 2141 is executed to run one or more applications 2140.

In some embodiments, the processor 2110 is also operative to execute radio threshold testing code 2121 to implement radio threshold testing logic 2120, and to execute network directed graph generator code 2161 to implement network directed graph generator 2160. The processor 2110 is also operative to execute linear network code generator code 2171 to implement linear network code generator 2170. The radio threshold testing logic 2120 may interact and communicate with the transceivers 2103 by using one or more APIs (application programming interfaces) and the kernel 2150. The radio threshold testing logic 2120 is operative to communicate with the transceivers 2103 to send and receive messages from neighbor devices and to obtain wireless interface measurement data from the neighbor devices. The wireless interface measurement data may be, for example, a received signal strength indicator (RSSI), signal-to-noise ratio (SNR), signal-to-noise-plus-interference ratio (SINR), etc. The transceivers 2103 may implement one or more wireless interfaces for establishing device-to-device communication. The wireless interfaces used by mobile device 2100 for device-to-device communication in a wireless ad hoc network may be, but are not limited to, a Long Term Evolution, 4th Generation (4G LTE) wireless interface such as 4G LTE unlicensed bands, IEEE 802.11x (WiFi®), Bluetooth®, etc.

The radio threshold testing logic 2120 may obtain RSSI, SINR or other wireless interface measurement data, or some other radio frequency (RF) system related measurement, from the transceivers 2103 over the internal communication bus 2105 and via the kernel 2150. The radio threshold testing logic 2120 may also receive wireless interface measurement data from neighbor devices and may assess that data to determine whether a neighbor device should be a vertex device in an ad hoc network.

For this determination, the radio threshold testing logic 2120 assesses two measurements against two corresponding thresholds. The first threshold is for the wireless interface signal strength to be at a level sufficient for packet data communication. The second threshold is to ensure that an acknowledgement can be received from the neighbor device.

Thus if the neighbor device can successfully receive ordered packets, and the source device can successfully receive acknowledgements when those packets are received, then the neighbor device can be designated as a vertex device by the source device. The vertex device can then assume the role of source device for the purpose of determining which of its neighbor devices may be designated as vertex devices.

The network directed graph generator 2160 is operative to communicate with the operating system 2130 and with the transceivers 2103. The network directed graph generator 2160 may communicate with the operating system 2130 the transceivers 2103 and the kernel 2150. The network directed graph generator 2160 is operative to obtain. vertex device identification information from the radio threshold testing logic 2120. The network directed graph generator 2160 may also communicate with the radio threshold testing logic 2120 and with the linear network code generator 2170. The network directed graph generator 2160 is operative to send an initial version of the network directed graph 2129 to neighbor devices.

The network directed graph generator 2160 generates the directed graph 2129 by initially adding mobile device 2100 neighbor devices that pass the edge presence rule, as vertex devices in the directed graph 2129. The radio threshold testing logic 2120 obtains the wireless interface measurements from the neighbor devices and from the transceiver/s 2103 and designates neighbor devices as vertex devices accordingly. This information is then passed to the network directed graph generator 2160. The network directed graph generator 2160 generates and stores the network directed graph 2129 in memory 2115, and sends a copy to each designated vertex device along with as graph construction request by communicating with the transceivers 2103 to send the information. The network directed graph generator 2160 is operative to receive network directed graph versions from each device to which it sent a graph construction request, and to update the network directed graph 2129 as a union of all received network directed graph versions.

When the mobile device 2100 assumes the role of a source device, after a final version of the network directed graph 2129 is completed, the network directed graph generator 2160 obtains a linear network code from the linear network code generator 2170. The linear network code generator 2170 is operative to generate a linear network code and include it with the network directed graph 2129. The network directed graph generator 2160 is operative to propagate the network directed graph 2129, including the linear network code, through the wireless ad hoc network to each vertex device and to the destination devices.

It is to be understood that any of the above described software components (i.e. executable instructions or executable code) in the example mobile device 2100 or any of the other above described components of example mobile device 2100 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile devices illustrated in the drawing figures described herein provide examples of a mobile device and are not to be construed as a limitation on the various other possible mobile device implementations that may be used in accordance with the various embodiments.

More particularly, the radio threshold testing logic 2120 and/or the network directed graph generator 2160 and/or the linear network code generator 2170, may individually or in combinations, be a single component or may be implemented as any combination of DSPs, ASICs, FPGAs, CPUs running executable instructions, hardwired circuitry, state machines, etc., without limitation. Therefore, as one example, the radio threshold testing logic 2120 may be implemented using an ASIC or an FPGA. In another example, the network directed graph generator 2160 and linear network code generator 2170 may each be a combination of software or firmware executed by a processor that gathers GC responses, constructs an overall network directed graph as a union of received network directed graphs, and generates a linear network code, etc. These example embodiments and other embodiments are contemplated by the present disclosure.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of setting up a wireless ad hoc network comprising:
   constructing an initial network graph by a source device, the network graph representing the source device, at least one intermediate device, and at least one communication path between the source device and the intermediate device;
   sending the initial network graph to the intermediate device and requesting an update;
   receiving a second network graph from the intermediate device in response to sending the initial network graph; and
   determining an updated network graph by performing a union of the initial network graph and the second network graph.

2. The method of claim 1, further comprising:
   determining a reduced network graph using the updated network graph;
   determining a linear network code using the reduced network graph; and
   sending the linear network code to the intermediate device and to at least one destination device.

3. The method of claim 1, further comprising:
   determining that that the intermediate device meets a packet data transmission criteria; and
   constructing the initial network graph representing the at least one communication path between the source device and the intermediate device in response to the intermediate device meeting the packet data transmission criteria.

4. The method of claim 1, further comprising:
   determining that the intermediate device meets a packet data transmission criteria; and
   sending the initial network graph to the intermediate device and requesting an update in response to determining that the intermediate device meets the packet data transmission criteria.

5. The method of claim 3, wherein determining that that the intermediate device meets a packet data transmission criteria; comprises:
   determining that the intermediate device wireless interface signal strength is above or equal to a first threshold.

6. The method of claim 5, further comprising:
   receiving a measurement from the intermediate device, the measurement indicating that the wireless interface signal strength of the source device at the intermediate device is above or equal to a second threshold, where the packet data transmission criteria requires meeting the first threshold and the second threshold.

7. The method of claim 4, wherein determining that that the intermediate device meets a packet data transmission criteria; comprises:
determining that the intermediate device wireless interface signal strength is above or equal to a first threshold.

8. The method of claim 7, further comprising:
receiving a measurement from the intermediate device, the measurement indicating that the wireless interface signal strength of the source device at the intermediate device is above equal to a second threshold, where the packet data transmission criteria requires meeting the first threshold and the second threshold.

9. The method of claim 1, further comprising:
determining that the intermediate device is a destination device; and
refraining from sending the initial network graph to the intermediate device and from requesting an update.

10. The method of claim 1, further comprising:
receiving and updating the initial network graph by the intermediate device, the intermediate device being the first intermediate device;
sending the updated initial network graph to a second intermediate device and requesting a second update;
receiving at the first intermediate device, a second updated initial graph from the second intermediate device;
revising the updated initial network graph by performing a union of the updated initial network graph and the second updated initial graph; and
sending the updated initial network graph to the source device.

11. The method of claim 10, further comprising:
determining that a third intermediate device is on a path from the source device to the first intermediate device; and
refraining from sending the updated initial network graph from the first intermediate device to the third intermediate device and from requesting an update.

12. A method of setting up a wireless ad hoc network comprising:
constructing an initial network graph by a source device, the network graph representing the source device, at least one intermediate device, and at least one communication path between the source device, and the intermediate device;
sending the initial network graph to the intermediate device and requesting an update of the initial network graph;
receiving a second network graph from the intermediate device as the update in response to sending the initial network graph and in response to the signal strength of the source device meeting a threshold as measured by the intermediate device; and
determining an updated network graph by performing a union of the initial network graph and the second network graph.

13. The method of claim 12, further comprising:
determining a reduced network graph using the updated network graph;
determining a linear network code using the reduced network graph; and sending the linear network code to the intermediate device and to ate least one destination device.

14. The method of claim 12, further comprising:
determining that the intermediate device signal strength meets a first threshold as measured by the source device; and
sending the initial network graph to the intermediate device and requesting an update in response to determining that the intermediate device signal strength met the first threshold.

15. The method of claim 12, further comprising:
determining a maximum number of packets that can be delivered contemporaneously to each destination device of a group of destination devices; and
constructing a reduced network graph comprising a reduced number of vertices and edges of the updated network graph such that a number of paths from the source device to each destination device, of the group of destination devices, is equal to the maximum number of packets.

16. A method of setting up a wireless ad hoc network comprising:
receiving wireless interface measurements of a source device from a plurality of neighbor devices by the source device and determining which neighbor device measurements meet a first threshold;
constructing an initial network graph by the source device, the network graph representing the source device, and any neighbor device for which the neighbor device measurements met the first threshold, and at least one communication path between the source device and each neighbor device represented on the initial network graph;
sending the initial network graph to each neighbor device represented on the initial network graph and requesting a network graph update from each neighbor device represented;
receiving a network graph update from each neighbor device to which the initial network graph was sent, in response to sending the initial network graph; and
revising the initial network graph by performing a union of the initial network graph and the network graph updates.

17. The method of claim 16, further comprising:
acting as an intermediate source device by each neighbor device during construction of the network graph updates, and receiving wireless interface measurements of itself as the intermediate source device from a plurality of downstream neighbor devices by the intermediate source device and determining which downstream neighbor device measurements meet the first threshold;
constructing the network graph update by the intermediate source device, the network graph update representing the intermediate source device, and any downstream neighbor device for which the downstream neighbor device measurements met the first threshold, and at least one communication path between the intermediate source device and each downstream neighbor device represented on the network graph update;
sending the network graph update to each downstream neighbor device represented on the network graph update and requesting a downstream network graph update from each downstream neighbor device represented;

receiving a downstream network graph update from each downstream neighbor device to which the network graph update was sent, in response to sending the network graph update; and revising the network graph update by performing a union of the network graph update and the downstream network graph updates.

18. The method of claim 16, wherein receiving a network graph update from each neighbor device to which the initial network graph was sent, in response to sending the initial network graph, comprises:

receiving a network graph update from the neighbor devices to which the initial network graph was sent or detecting a timeout condition of a maximum time allowed to receive a network graph update, in response to sending the initial network graph; and removing any neighbor devices from the initial network graph for which a timeout condition occurred such that a network graph update was not received during the maximum time allowed.

19. The method of claim 17, further comprising:

iteratively performing the steps of claim 16 by one or more additional tiers of downstream neighbor devices such that each downstream neighbor device of each tier acts as an intermediate source device to its downstream neighbor devices to construct the network graph update; and sending the revised network graph update to an upstream intermediate source device by each intermediate device of each lower tier.

* * * * *